United States Patent
Tetrault et al.

(10) Patent No.: US 9,963,835 B2
(45) Date of Patent: May 8, 2018

(54) SYNTHETIC TURF HAVING A COOLING LAYER

(71) Applicant: SAPTURF, LLC, Cincinnati, OH (US)

(72) Inventors: Christopher Tetrault, Amelia, OH (US); Phil M. Stricklen, Dalton, GA (US); Raymond A Berard, Portsmouth, RI (US)

(73) Assignee: Sapturf LLC, Amelia, OH (US)

( * ) Notice: Subject to any disclaimer, the term of this patent is extended or adjusted under 35 U.S.C. 154(b) by 567 days.

(21) Appl. No.: 14/324,463

(22) Filed: Jul. 7, 2014

(65) Prior Publication Data

US 2014/0322459 A1 Oct. 30, 2014

Related U.S. Application Data

(60) Division of application No. 13/414,813, filed on Mar. 8, 2012, now Pat. No. 8,795,834, which is a continuation-in-part of application No. 12/646,250, filed on Dec. 23, 2009, now abandoned.

(60) Provisional application No. 61/150,905, filed on Feb. 9, 2009, provisional application No. 61/251,579, filed on Oct. 14, 2009.

(51) Int. Cl.

| E01C 13/08 | (2006.01) |
|---|---|
| B01J 20/26 | (2006.01) |
| B01J 20/32 | (2006.01) |
| C09K 5/14 | (2006.01) |
| C08J 3/24 | (2006.01) |
| C08J 7/04 | (2006.01) |
| E01C 5/20 | (2006.01) |

(52) U.S. Cl.
CPC ............ *E01C 13/08* (2013.01); *B01J 20/26* (2013.01); *B01J 20/3231* (2013.01); *C08J 3/24* (2013.01); *C08J 7/04* (2013.01); *C09K 5/14* (2013.01); *E01C 5/20* (2013.01); *Y10T 428/23921* (2015.04); *Y10T 428/2982* (2015.01); *Y10T 428/2991* (2015.01); *Y10T 428/2998* (2015.01)

(58) Field of Classification Search
CPC . E01C 13/08; Y10S 273/13; C08J 3/24; C08J 7/04; C09K 5/14; Y10T 428/23921; Y10T 428/2982; Y10T 428/2991; Y10T 428/2998; B01J 20/26; B01J 20/3231
See application file for complete search history.

(56) References Cited

U.S. PATENT DOCUMENTS

| 7,153,553 B2 * | 12/2006 | Tetrault | A41G 1/009 428/17 |
| 8,795,834 B2 * | 8/2014 | Tetrault | E01C 13/08 428/17 |
| 9,540,777 B1 * | 1/2017 | Tetrault | E01C 13/08 |
| 2006/0172092 A1 * | 8/2006 | Tetrault | A41G 1/009 428/17 |

(Continued)

*Primary Examiner* — Cheryl Juska
(74) *Attorney, Agent, or Firm* — Jenei LLC

(57) ABSTRACT

The present invention describes a synthetic turf having super absorbent materials in order to keep the synthetic turf cooler than conventional synthetic turfs. The present invention also provides for synthetic turf infill cooling particles comprising a layer of water-absorbing material coating a foundation comprising a core substrate. In one embodiment, the cooling particle is comprised of a core particle or substrate, which is coated with a water-absorbing material. In one embodiment, the water-absorbing material is a super absorbent polymer.

16 Claims, 5 Drawing Sheets

(56) References Cited

U.S. PATENT DOCUMENTS

| | | | |
|---|---|---|---|
| 2008/0317978 A1* | 12/2008 | Smit | E01C 13/08 428/17 |
| 2009/0242833 A1* | 10/2009 | Chen | C05D 9/02 252/194 |
| 2010/0203265 A1* | 8/2010 | Tetrault | E01C 13/08 428/17 |
| 2011/0117297 A1* | 5/2011 | Harmeling | E01C 13/08 428/17 |
| 2011/0289841 A1* | 12/2011 | Thrash | A01G 9/1086 47/59 S |
| 2012/0258811 A1* | 10/2012 | Tetrault | E01C 13/08 472/92 |

\* cited by examiner

SYNTHETIC TURF HAVING A COOLING LAYER

CROSS-REFERENCE TO RELATED APPLICATIONS

The present application is a divisional and claims priority to nonprovisional U.S. patent application Ser. No. 13/414,813 filed Mar. 8, 2012, now U.S. Pat. No. 8,795,834, which is a continuation-in-part to and claims priority to nonprovisional U.S. patent application Ser. No. 12/646,250 filed Dec. 23, 2009, now abandoned, to provisional U.S. Patent Application No. 61/150,905 filed Feb. 9, 2009 and to provisional U.S. Patent Application No. 61/251,579 filed Oct. 14, 2009.

BACKGROUND ON THE INVENTION

1. Field of the Invention

The present invention relates generally to synthetic turf for landscaping, roofing, and athletic fields, and more particularly to synthetic turf having a cooling layer to substantially dissipate heat buildup common with synthetic turf. The invention also relates to 2. Description of the Related Art Traditionally, athletic fields, as well as landscaped areas for homes and businesses, are covered with a natural grass covering. The natural grass is advantageous for cushioning and ability to quickly recover from abuse from weather, people, or both.

In recent years, however, many athletic fields have been converted from natural grass to synthetic turf systems. The reasons for converting to synthetic turf is most often linked to the high costs and time related to maintaining natural grass. Further, natural grass may have problems growing in certain environmental and man-made conditions, such as for example, desert regions, spaces shaded by buildings, domed fields and high traffic areas. In areas where the natural grass cannot grow properly or adequately, injuries can result from inadequate footing. In addition, poorly growing natural grass is typically not aesthetically pleasing.

Synthetic turf systems have improved over the years to appear more like natural grass coverings. Other improvements have been made to give more cushioning and elasticity to the synthetic turf to make it more equal to the advantages of natural grass turf.

However, a primary disadvantage of synthetic turf systems still exists. In particular, most synthetic turf systems are comprised primarily of plastics, such as, for example, polyolefin. Such plastics absorb, retain, and radiate heat that can increase the temperature on a field to a potentially fatal level. Even the American Academy of Pediatrics has identified infill artificial turf as contributing to elevating a person's core body temperature, thereby leading to heat related injuries such as, for example, heat cramps, heat exhaustion and heat stroke.

It has been found that naked synthetic turf systems, that is, synthetic tuft coverings without infill material, such as, for example, sand and rubber, can reach temperatures of 140° F. or greater. Natural grass coverings measure about 85° F. under similar circumstances. Essentially, the materials comprising most synthetic turf systems absorb heat from the sun and retain the heat in the ground to a much greater extent than natural grass coverings. Sand and rubber granules have been used as infill to increase footing and playability of athletic fields, but such infill materials do not mitigate heating issues of infill artificial tuft. In fact, rubber infill may actually contribute to increasing the temperature of the artificial turf. Lighter colored rubber granules and wetting the sand infill have been proposed as a mean by which to try and decrease the overall temperature of the synthetic turf system, however, such proposals tend to cool the artificial turf for a very limited time and only at an almost insignificant temperature change.

In addition to being related to increasing heat-related injuries, synthetic turf systems also are associated with heat pollution. The massive amount of heat rising from urban areas is increasingly being linked to both a delay and stimulation of precipitation. Some areas are experiencing a noticeable decrease in much needed rain and snow, while other areas are seeing an increase. There is strong support that heat and pollution from urban areas effects climate in an alarming way; primarily by redistributing water in an undesired fashion.

As such, governments are considering and implementing environmental standards to limit the heat generated from urban areas. Some of the standards call for increased natural green spaces and fewer areas of blacktop and concrete, that is, artificial spaces that buildup and give off great amounts of heat pollution. Typical synthetic turf systems can behave very much like blacktop when it comes to heat pollution.

Attempts have been made to decrease the temperature of synthetic turf systems. Attempts to cool synthetic tuft coverings include watering down the coverings. However the water quickly evaporates. More recent attempts include mechanical means in which a series of cooling pipes are constructed under the synthetic turf systems. However, such mechanical means is expensive and would require removing currently laid synthetic turf systems.

Ceramic beads having about 50% porosity have been combined with sand and rubber granules to supplement mechanical cooling systems as a means for cooling artificial turf coverings. However, the ceramic beads are unable to hold enough water to significantly decrease the temperature of the synthetic turf system. Lighter colored rubber has also been proposed as a means for decreasing the temperature of the synthetic turf system, but also does not lend to significantly decreasing the overall temperature of the synthetic turf system.

Other means of cooling synthetic turfs are set forth in U.S. Pat. No. 5,153,553 to Tetrault where super absorbent polymers are included in infill. Although such means is successful in decreasing synthetic turf temperatures, the super absorbent polymers in such circumstances risk being separated from the associated synthetic turf due to weather and wear and tear.

Thus, what is needed is an economically affordable means for cooling synthetic turf systems over a significant period of time without concern of loss of cooling materials that are also environmentally friendly.

SUMMARY

The various exemplary embodiments of the present invention include a synthetic turf system. The synthetic turf system is comprised of a foundation, a plurality of grass-like filaments, and at least one cooling mat. The foundation is selected from one or more of bare ground, stone, gravel, sand, asphalt, cement, and rubber. The plurality of grass-like filaments is attached to a backing layer such that the backing layer is substantially adjacent to the topside of the foundation and the plurality of grass-like filaments extend substantially upward from the backing layer. The at least one cooling mat is comprised of one or more layers wherein at least one of the layers is comprised of super absorbent polymers.

The various exemplary embodiments of the present invention further include a method of cooling a synthetic turf system. The synthetic turf system is comprised of a foundation, wherein the foundation is selected from one or more of bare ground, stone, gravel, sand, asphalt, cement, and rubber; and a plurality of grass-like filaments attached to a backing layer such that the backing layer is substantially adjacent to the topside of the foundation and the plurality of grass-like filaments extend substantially upward from the backing layer. The method includes the steps of introducing one or more acrylic polymers admixed with a monomer that causes cross-linking the polymers to form one or more superabsorbent polymer intermeshed and crosslinked within the cooling mat such that the SAP cannot be separated from the mat. The exemplary embodiments of the present invention further include synthetic turf system comprised of a foundation and a plurality of grass-like filaments. The foundation is selected from one or more of bare ground, stone, gravel, sand, asphalt, cement, and rubber. The plurality of grass-like filaments are attached to at least one cooling mat comprised of one or more layers such that at least one of the layers is comprised of super absorbent polymers and is substantially adjacent to the topside of the foundation and the plurality of grass-like filaments extend substantially upward from the at least one cooling mat.

BRIEF DESCRIPTION OF THE DRAWINGS

The various exemplary embodiments of the present invention, which will become more apparent as the description proceeds, are described in the following detailed description in conjunction with the accompanying drawings, in which.

DESCRIPTION OF THE REFERENCED NUMERALS

Figure 1:
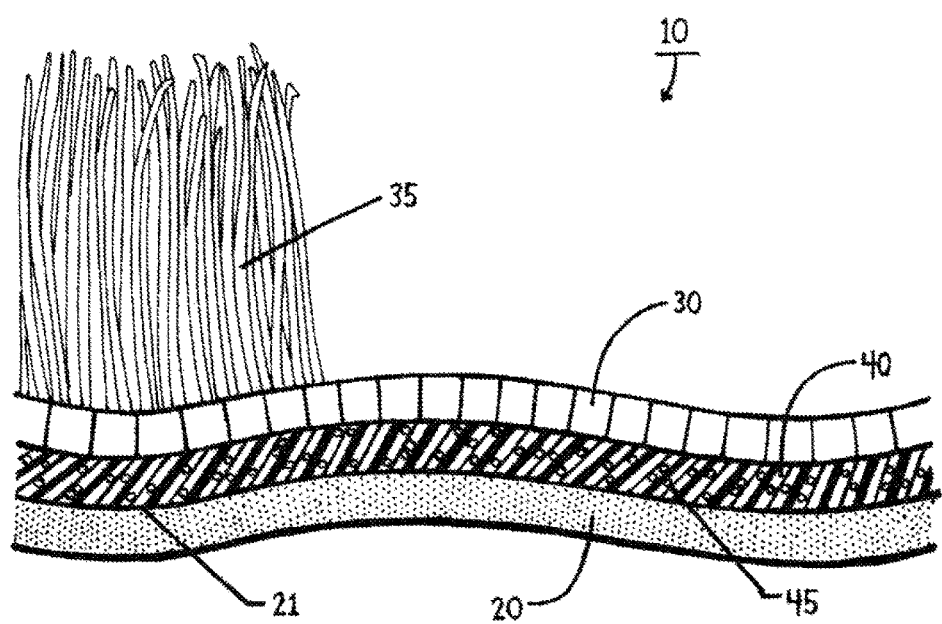
FIG. 1 is an illustrated representation of an exemplary embodiment of the present invention.

In reference to the drawings, similar reference characters denote similar elements throughout all the drawings. The following is a list of the reference characters and associated element:

10 synthetic turf system
20 foundation
21 topside of foundation
30 backing layer
35 plurality of grass-like filaments
40 cooling mat
45 super absorbent polymer
50 infill
60 a first (bottom) infill layer
70 a second (top) infill layer
80 one or more third (middle) infill layers
90 one or more modified third (middle) infill layers
100 SAP-coated particles
110 superabsorbent polymer coating
120 core particle
130 binder

DETAILED DESCRIPTION

Before describing the present invention in detail, it is to be understood that this invention is not limited to particularly exemplified systems or process parameters as such may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated as incorporated by reference.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Definitions

As used in the present specification, the following words and phrases are generally intended to have the meanings as set forth below, except to the extent that the context in which they are used indicates otherwise.

"Binder," "binding agent" or "coupling agent" refers to a material having binding, adhesive or attachment properties with or without chemical, thermal, pressure or other treatment. The term "binder" includes materials that are capable of attaching themselves to a substrate or are capable of attaching other substances to a substrate. The binder component used in the coating compositions of this invention can include any polymeric material customarily used as a binder in coating compositions.

In one embodiment, the binder is a composition such as water, polyacrylate, lignin sulfonate (solid), polymeric binders, silicone polymer, e.g., polyorganosiloxane, and combinations thereof. In another embodiment, the organic polymerizable binders include, but are not limited to, carboxymethylcellulose (CMC) and its derivatives and its metal salts, guar gum cellulose, xanthan gum, starch, lignin, polyvinyl alcohol, polyacrylic acid, styrene butadiene resins (SBR), and polystyrene acrylic acid resins.

In one embodiment, the binders are selected from the group consisting of acrylic acid grafted starch, alginates, alkoxysilanes, for example, tetraethoxy silane (TEOS), block co-polymers, carboxy methyl cellulose, carboxymethyl starch, carboxymethylcellulose, carrageenan gum, casein, celluloseacetate phthalate, cellulose based polymers, cellulosederivatives such as dextrans and starches, gelatin, guar gum cellulose, hydrolyzed acrylonitrile grafted starch, hydroxymethyl cellulose, lignin, locust bean gum, maleic anhydride copolymers, methyl cellulose, monomeric silanes, natural gums, pectins, poly (2-hydroxyethylacrylate), poly (ethyleneoxide), poly (sodium acrylate-co-acrylic acid), poly(2-hydroxyethyl-methacrylate), poly(acrylamides), poly(acrylates), poly(ethers), poly(methacrylic acid), poly(N-vinyl pyrrolidone), poly(vinyl alcohol), poly(vinyl sulfonates), poly(vinylsulfonic acid), polyesters, polyethylene oxide, polymeric binders, polymers formed from acid-group containing monomers, polyorganosiloxane, polystyrene acrylic acid resins, polyurethanes, polyvinylalcohol, polyvinylmethyl ether, polyvinylpyrrolidone, silicates, silicone polymer, starch, starch-based polymers, silanes, organosiloxanes, styrene butadiene resins, xanthan gum and mixtures thereof.

The term "coupling agent" refers to a binder that is used as an adhesion promoter enhancing adhesion between a surface of an inorganic material, such as silica, and an organic material through chemical coupling therebetween during formulation of the composition.

The term "cross-linking" or "cross-linked" used in reference to the superabsorbent polymer refers to any means for effectively rendering normally water-soluble materials substantially water-insoluble but swellable. Such a cross-linking means can include for example, physical entanglement, crystalline domains, covalent bonds, ionic complexes and associations, hydrophilic associations such as hydrogen bonding, hydrophobic associations or Van der Waals forces. Superabsorbent polymers include internal cross-linking and surface cross-linking.

"Performance-enhancing active" or "Performance-enhancing additive" as used herein, refers to any additive which is desirable to add to the infill particles including an antimicrobial, an odor reducing material, a binder, a fragrance, a color altering agent, a dust reducing agent, a nonstick release agent, a superabsorbent material, cyclodextrin, zeolite, activated carbon, a pH altering agent, a salt forming material, a ricinoleate, silica gel, UV stabilizers or protectants, crystalline silica, activated alumina, an anti-clumping agent, and mixtures thereof. Performance-enhancing actives that inhibit the formation of odor include a water-soluble metal salt such as silver, copper, zinc, iron, and aluminum salts and mixtures thereof.

In one embodiment, the performance-enhancing additive is sprayed onto the particles. In another embodiment, the performance-enhancing additives are dry-blended with the particles. In another embodiment the performance enhancing additive is blended with an elastomeric material than ground into particles.

The term "polymer" includes, but is not limited to, homopolymers, copolymers, for example, block, graft, random, and alternating copolymers, terpolymers, etc., and blends and modifications thereof. Furthermore, unless otherwise specifically limited, the term "polymer" shall include all possible configurational isomers of the material. These configurations include, but are not limited to isotactic, syndiotactic, and atactic symmetries.

"Polymer" as used herein, refers to a series of repeating monomeric units that have been cross-linked or polymerized. Any suitable polymer can be used to carry out the present invention. It is possible that the polymers of the invention may also comprise two, three, four or more different polymers. In some embodiments, of the invention only one polymer is used. In some preferred embodiments a combination of two polymers are used. Combinations of polymers can be in varying ratios, to provide coatings with differing properties. Those of skill in the art of polymer chemistry will be familiar with the different properties of polymeric compounds. Examples of polymers that may be used in the present invention include, but are not limited to polycarboxylic acids, cellulosic polymers, proteins, polypeptides, polyvinylpyrrolidone, maleic anhydride polymers, polyamides, polyvinyl alcohols, polyethylene oxides, glycosaminoglycans, polysaccharides, polyesters, polyurethanes, polystyrenes, copolymers, silicones, polyorthoesters, polyanhydrides, copolymers of vinyl monomers, polycarbonates, polyethylenes, polypropylenes, polylactic acids, polyglycolic acids, polycaprolactones, polyhydroxybutyrate valerates, polyacrylamides, polyethers, polyurethane dispersions, polyacrylates, acrylic latex dispersions, polyacrylic acid, mixtures and copolymers thereof. The polymers of the present invention may be natural or synthetic in origin, including gelatin, chitosan, dextrin, cyclodextrin, poly(urethanes), Poly(siloxanes) or silicones, Poly(acrylates) such as poly(methyl methacrylate), poly(butyl methacrylate), and Poly(2-hydroxy ethyl methacrylate), Poly(vinyl alcohol) Poly(olefins) such as poly(ethylene), poly(isoprene), halogenated polymers such as Poly(tetrafluoroethylene)—and derivatives and copolymers such as those commonly sold as Teflon products, Poly(vinylidine fluoride), Poly(vinyl acetate), Poly(vinyl pyrrolidone), Poly(acrylic acid), Poly-acrylamide, Poly(ethylene-co-vinyl acetate), Poly(ethylene glycol), Poly(propylene glycol), Poly(methacrylic acid); etc.

The term "polyolefin" as used herein generally includes, but is not limited to, materials such as polyethylene, polypropylene, polyisobutylene, and the like, the homopolymers, copolymers, terpolymers, etc., thereof, and blends and modifications thereof. The term "polyolefin" shall include all possible structures thereof, which include, but are not limited to, isotatic, synodiotactic, and random symmetries. Copolymers include atactic and block copolymers.

The term "rubber" as used in relation to either rubber particles or rubber coated particles means any resilient elastomeric material, including natural and artificial rubbers, elastomers and polymers such as thermoplastic polymers and elastomers and equivalent materials.

Examples of elastomers include acryl rubber, butyl rubber, carboxylated acrylonitrile butadiene rubber (XNBR), carboxylated hydrogenated acrylonitrile butadiene rubber (XHNBR), EPDM/acrylonitrile graft copolymer, EPDM/styrene copolymer, epoxylated natural rubber, ethylene propylene (EPR), ethylene-propylene copolymers, ethylene-propylene-diene monomer (EPDM) rubber, ethylene-propylene-diene terpolymers, ethylenically unsaturated nitrile-conjugated diene-based high saturation copolymer rubber, fluoroelastomers (FKM), halogenated butyl rubber, hereinafter called EPDM, hereinafter called EPM, hydrin rubber, hydrogenated acrylonitrile butadiene rubber (HNBR), hydrogenated carboxylated acrylonitrile butadiene rubber (HXNBR), maleated BIMS copolymer, maleated ethylene-acrylic acid copolymer, maleated ethylene-butene rubber, maleated ethylene-decene rubber, maleated ethylene-ethyl acrylate copolymer, maleated ethylene-hexene rubber, maleated ethylene-methyl acrylate copolymer, maleated ethylene-octene rubber, maleated ethylene-propylene copolymer rubber, maleated ethylene-vinyl acetate copolymer, maleated halogenated isobutylene-isoprene copolymer, maleated isobutylene-isoprene copolymer, maleated isobutylene-paramethylstyrene copolymer, maleated star branched butyl (SBB) copolymer, maleic acid modified EPDM/acrylonitrile graft copolymer, maleic acid modified EPDM/styrene copolymer, maleic anhydride grafted acrylonitrile-butadiene-styrene rubber, maleic anhydride grafted ethylene-propylene-diene rubber, maleic anhydride grafted styrene-ethylene/butadiene-styrene rubber, natural rubbers, nitrile acrylonitrile butadiene rubber (NBR), nitrile butadiene rubber, nitrile rubber, perfluoroelastomers (FEKM), polyetheresters, polyethylene or polypropylene homo- or copolymers and polyisobutylene, polyisoprene, polymers comprising a thermoplastic and an elastomer, polyurethanes, reactive phenoxy thermoplastic resins, styrene-butadiene rubber (SBR), styrene/maleic acid copolymer, tetrafluoroethylene and propylene monomer (FEPM) elastomers as well as copolymers and mixtures thereof.

Examples of thermoplastic elastomers (TPE) include:
1) Styrenic Block Copolymers (TPE-S) SBS is based on two-phase block copolymers with hard and soft segments. The styrene end blocks provide the thermoplastic properties and the Butadiene mid-blocks provide the elastomeric properties. SBS when hydrogenated becomes SEBS, as the elimination of the C=C bonds in the butadiene component generated ethylene and butylenes mid-block, hence the SEBS acronym. Much improved heat resistance, mechanical properties and chemical resistance characterize SEBS. Monprene® Tekron® and Elexar® products from Teknor Apex are good examples of hydrogenated styrenic block copolymers.
2) Thermoplastic Polyolefins (TPE-O or TPO) These materials are blends of polypropylene (PP) and un-cross-linked EPDM rubber, in some cases a low degree of cross-linking is present to boost heat resistance and compression set properties.
3) Thermoplastic vulcanisates (TPE-V or TPV) These materials are the next step up in performance from TPE-O. These are compounds of PP and EPDM rubber, however they have been dynamically vulcanized during the compounding step. The Uniprene® series from Teknor Apex is a very good example of TPE-V. Uniprene XL increases the upper temperature limit towards 140° C. with big improvements in long terms compression set resistance versus standard TPE-V materials. There are a number of new TPE-Vs being introduced, termed "Super TPVs" which are based on engineering plastics blended with high performance elastomers, which can offer greatly improved heat and chemical resistance.
4) Thermoplastic polyurethanes (TPE-U or TPU) These materials can be based on polyester or polyether urethane types and are used in applications where a product requires excellent tear strength, abrasion resistance, and flex fatigue resistance.
5) Thermoplastic copolyesters (TPE-E or COPE or TEEE) are used where increased chemical resistance and heat resistance up to 140° C. are needed.
6) Melt processable rubber (MPR) is designed for more demanding applications requiring chemical resistance, particularly resistance to oil and grease, where MPR replaces cross-linked nitrile rubber. It also possesses properties similar to those of vulcanized rubber in noise-dampening applications and has similar stress relaxation properties.
7) Thermoplastic polyether block amides (TPE-A) These products offer the good heat resistance, have good chemical resistance and bonding to polyamide engineering plastics.

In one embodiment, the synthetic rubber may be a butadiene rubber comprising from about 100% to about 60% by weight of the composition. In one embodiment, the butadiene rubber is polybutadiene or styrene-butadiene rubber that preferably comprises from about 90% to about 80% by weight of the composition. In one embodiment, however, the butadiene rubber is a styrene-butadiene that comprises about 85-90% by weight of the composition. The synthetic rubber is preferably granulized with the granules having a diameter that allows for maximum sized air voids while giving the desired degree of softness-hardness and strength. In one embodiment, the granule size ranges from about 1 millimeters to about 10 millimeters in diameter. In one embodiment, the source for the granulized synthetic rubber is recycled tires that are commercially available. In one embodiment, the granulized rubber is preferably comprised of granulized reinforced polycord tires with no steel present and with the polycord being comprised of nylon or polyester.

"Substrate" as used herein, refers to any surface upon which it is desirable to deposit a coating comprising a polymer, a mix of polymers or water-absorbing materials. In the present invention, the substrate is generally made up of fine granules of stone, gravel, sand, asphalt, cement, ceramic beads, soil, clay, diatomaceous earth, perlite, silica, organic minerals, rubber or combinations thereof.

The term "superabsorbent materials" refers to water-swellable, water-insoluble organic or inorganic materials including superabsorbent polymers and superabsorbent polymer compositions capable, under the most favorable conditions, of absorbing at least about 1 times their weight, or at least about 5 times their weight, or at least about 10 times their weight in an aqueous solution. Superabsorbent materials include a "superabsorbent polymer" or "SAP", a normally water-soluble polymer which has been cross-linked to render it substantially water insoluble, but capable of absorbing water. Numerous examples of superabsorbers and their methods of preparation may be found for example in U.S. Pat. Nos. 4,102,340; 4,467,012; 4,950,264; 5,147,343; 5,328,935; 5,338,766; 5,372,766; 5,849,816; 5,859,077; and U.S. Pat. No. Re. 32,649.

SAPs generally fall into three classes, namely starch graft copolymers, cross-linked carboxymethylcellulose derivatives and modified hydrophilic polyacrylates. Non-limiting examples of such absorbent polymers are hydrolyzed starch-acrylate graft co-polymer, saponified acrylic acid ester-vinyl co-polymer, neutralized cross-linked polyacrylic acid, cross-linked polyacrylate salt, and carboxylated cellulose. The preferred SAPs, upon absorbing fluids, form hydrogels. SAPs are well known and are commercially available from several sources.

The term "surface cross-linking" means that the level of functional cross-links in the vicinity of the surface of the superabsorbent polymer particle generally is higher than the level of functional cross-links in the interior of the super-absorbent polymer particle. As used herein, "surface" describes the outer-facing boundaries of the particle. For porous superabsorbent polymer particles, exposed internal surfaces also are included in the definition of surface.

"Water-absorbing material" as used herein includes, but is not limited to a hydrophilic polymer. "Water-absorbing material" as used herein includes, but is not limited to a highly absorbent material, which may comprises a superabsorbent polymer. Examples of water-vapor trapping materials include, but are not limited to, acrylate polymers, generally formed from acrylic acid, methacrylic acid, acrylate, methyl acrylate, ethyl acrylate, methyl methacrylate, ethyl methacrylate, a dialkylaminoalkyl acrylate, a dialkylaminoalkyl methacrylate, a trialkylammonioalkyl acrylate, and/or a trialkylammonioalkyl methacrylate, and include the polymers or copolymers of acrylic acid, methacrylic acid, methyl methacrylate, ethyl methacrylate, 2-dimethylaminoethyl methacrylate, and trimethylammonioethyl methacrylate chloride. Examples of hydrophilic polymers include, but is not limited to poly(N-vinyl lactams), poly(N-vinyl acrylamides), poly(N-alkylacrylamides), substituted and unsubstituted acrylic and methacrylic acid polymers, polyvinyl alcohol (PVA), polyvinylamine, copolymers thereof and copolymers with other types of hydrophilic monomers (e.g. vinyl acetate), polysaccharides, cross-linked acrylate polymers and copolymers, carbomers, cross-linked acrylamide-sodium acrylate copolymers, gelatin, vegetable polysaccharides, such as alginates, pectins, carrageenans, or xanthan, starch and starch derivatives, galactomannan and galactomannan derivatives polyvinyl pyrrolidone (PVP), poly(N-vinyl caprolactam) (PVCap), poly(N-vinyl acetamides), polyacrylic acid, polymethacrylic acid, and copolymers and blends thereof. PVP and PVCap. Examples of superabsorbent polymers include hydrogels. Copolymers of any of the water-vapor trapping materials mentioned herein, and blends thereof may also be used.

The term "% by weight" or "% wt" when used herein and referring to components of the superabsorbent polymer composition, is to be interpreted as based on the weight of the dry superabsorbent polymer composition, unless otherwise specified herein.

These terms may be defined with additional language in the remaining portions of the specification.

1. Description of the Cooling Layer

FIG. 1 is an illustration of an exemplary embodiment of a synthetic turf system 10 of the present invention. As shown, the synthetic turf system comprises a backing layer 30 resting upon a foundation 20.

The foundation may be bare ground, gravel, sand, rubber, construction materials, or a combination thereof with stone or other similar materials in order to provide support and adequate drainage for the synthetic turf system.

The foundation may be slightly angled towards strategically placed drain pipes to better and faster drying of the synthetic turf system's top surface after rain or melted snow.

The backing layer may be comprised of any known woven, non-woven, or spun-bonded fabric to which grass-like filaments 35 may be attached. Examples of conventional backing layers include woven warp type strands or slit film and cross or woof type strands or slit film to produce a woven sheet. It is preferred that the backing layer comprise of a stable, weather resistant material such as polyolefins, nylon, or similar material.

The backing layer is preferably supple and flexible such that it may conform to the foundation layer and potentially give when impacted. The backing layer may also include one or more openings for movement of fluids such as, for example, water.

Grass-like filaments 35 are attached to the backing layer such that the grass-like filaments extend substantially upward, away from the foundation and backing layer. The grass-like filaments may be groups of filaments individually attached to the backing layer or thick individual filaments that are split at the top to give the appearance of numerous individual fibers.

The grass-like filaments may vary in thickness and size to give an appearance of natural grass. Typically, the grass-like filaments are comprised of one or more polyolefins, one or more nylons, or the like.

Any known foundation, backing layer and grass-like filaments may be used in the various exemplary embodiments of the present invention.

The synthetic turf system may be further comprised of a cooling mat 40 positioned between the topside of the foundation and the backing layer. The cooling mat may be comprised of one or more layers. When more than one layer comprises the cooling mat, each layer of the cooling mat may be of different compositions than other layers. At least one of the layers is comprised of super absorbent polymers on a fibrous substrate.

Figure 2:
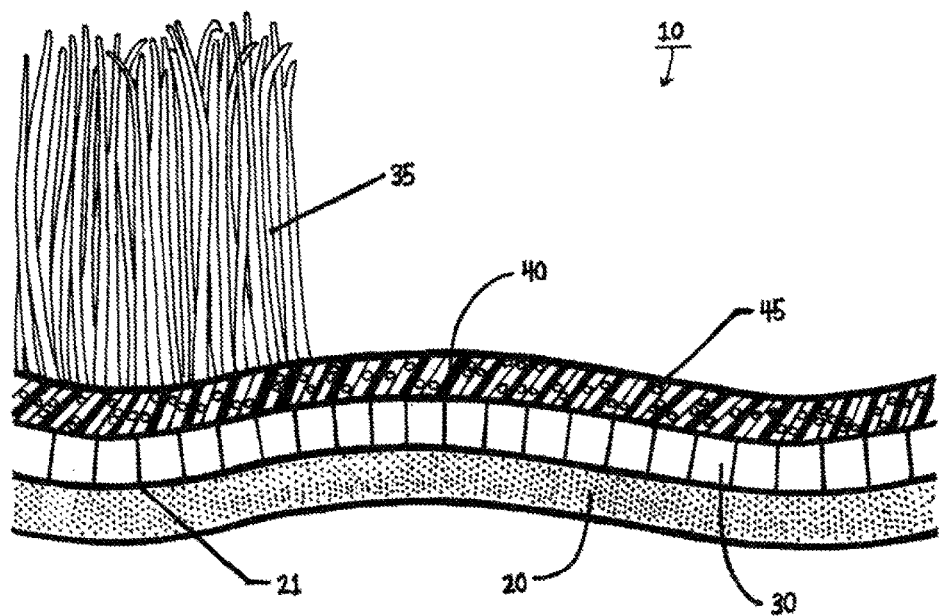
FIG. 2 is an illustration representing another exemplary embodiment of the present invention in which the cooling mat is positioned above a backing layer.

In exemplary embodiments, the cooling mat may be positioned between the topside of the foundation and the backing layer, as illustrated in FIG. 1. In other exemplary embodiments, as illustrated in FIG. 2, the cooling mat may be positioned above the backing layer. In such embodiment, it is preferred that the grass-like filaments are tufted through the cooling mat and primarily attached to the backing layer. In a similar variation, the super absorbent polymer may be formed such that it is cross-linked and polymerized to a tube-shaped surround through which the grass-like filaments are substantially enclosed and attached to the backing layer.

In yet another exemplary embodiment, the cooling mat may be positioned both between the foundation and the backing layer, and above the backing layer, such that there are multiple cooling mat layers. In yet another exemplary embodiment, the cooling mat may be positioned between a first backing layer and a second backing layer.

In other exemplary embodiments, the plurality of grass-like filaments are tufted or attached directly to the cooling mat, and there is not an adjacent or attached backing layer. This embodiment is illustrated, for example, in FIG. 3.

The fibrous substrates of the cooling mat may be woven or non-woven, including woven or non-woven polyester, woven or non-woven fiberglass, needle-punched polyester or polyolefin, or any other fibrous substrate that can be coated. Examples of fibrous substrates include spun-bonded polyester or polyolefin. Fibrous substrates useful in the present invention may also be made of other polymers such as, for example, nylon and Kevlar; natural fibers such as, for example, flax, hemp, and wool; or combinations thereof.

The super absorbent polymers of the cooling mat may be, for example, polymers or copolymers of partially neutralized acrylic acid, acrylamide, or acrylic esters as copolymer only. Preferably, the super absorbent polymer may swell in water or other introduced liquids up to about 200 to about 400 times its size. It is also preferred that the super absorbent polymers are nontoxic.

The cooling mat may be prepared by dipping, spraying, and/or dot spraying an aqueous solution of an acrylic monomer and cross-linking agent onto the fibrous substrate. Upon polymerization of the acrylic monomer, the resultant cross-linked polymer should be substantially entangled within the fibrous substrate.

In an exemplary embodiment, the acrylic monomer solution is in the form of the partially neutralized acrylic acid. The partially neutralized acrylic acid is introduced in water to one or more cross-linking agents and UV-sensitive or peroxide reagents. A UV-light or heat may be used to form the polymer as a cross-linked polymer without the cross-linking monomers, but the cross-linking agents assist in better controlling the level and degree of cross-linking and strength associated with cross-linked polymers.

Polymerization of the one or more super absorbent polymers may occur via exposure to ultraviolet (UV) light radiation, peroxides, or other known polymerization process. UV-dependent photoinitiators of polymerization useful in exemplary embodiments of the present invention are water-soluble or water dispersible compounds that generate free radicals upon exposure to UV irradiation. Examples of such polymerization initiators include, 4-benzoyl-N, N-dimethyl-N-(1-(1-oxo-2-propenyloxy)ethyl) benzenemethananaminium bromide (available commercially as Quantacure ABQ) in combination with N-methyl-diethanolamine (NMDEA), and 2-hydroxy-2-methyl-1-phenyl-1-propanone (available commercially as Darocure 1173).

When the super absorbent polymers are contacted with water, the super absorbent polymers increase dramatically in size. Depending on the relative size and thickness, the super absorbent polymers may reach maximum moisture retention in as quickly as about ten minutes can reach maximum hydration in as little as ten minutes or as much as days. After reaching maximum moisture retention the retained moisture slowly releases from the super absorbent polymers depending on the particular conditions present, such as, for example, ambient temperature, sunlight, humidity, etc. Typically, the moisture evaporates from the super absorbent polymers and thereby keeps the backing layer and grass-like filaments cool.

Polymerization and cross-linking of the acrylic monomers and cross-linking agents to form super absorbent polymers within the cooling layer significantly ensures limited movement of the resultant super absorbent polymers relative to the cooling layer, thereby substantially maintaining within the associated synthetic turf system despite weather, traffic, water flow, and the like upon the synthetic turf system. Maintaining the super absorbent polymers within the synthetic turf system decreases the need to have to reintroduce or resupply the synthetic turf system with cooling materials.

Cross-linking agents instrumental in propagating the polymerization and forming a branched network of polymers include, for example, N, N-methylene bis acrylamide (NMBA), polyethylene glycol diacrylate (PEGDA) and polyethylene glycol dimethacrylate (PEGDMA).

A solution of a polymer, that is, for example, a non-cross-linked acrylic polymer, and a cross-linking agent may also be injected into one or more layers of an already-installed traditional synthetic turf system, such that the acrylic polymers are injected into and/or onto the synthetic turf immediately upon being admixed. The means of injecting substances such as, for example, acrylic polymer solutions and cross-linking reagents is known in the art.

The various exemplary embodiments of the present invention further include a method of cooling a synthetic turf system, that is, for example, a traditional synthetic turf system that has already been installed. The synthetic turf system may be comprised of a foundation, wherein the foundation is selected from one or more of bare ground, stone, gravel, sand, asphalt, cement, rubber, and construction materials; and a plurality of grass-like filaments attached to a backing layer such that the backing layer is substantially adjacent to the topside of the foundation and the plurality of grass-like filaments extend substantially upward from the backing layer. The method includes the steps of introducing a solution of one or more non-cross-linked acrylic polymers and one or more cross-linking agents into or below the synthetic turf system; and cross-linking the acrylic polymer to form one or more superabsorbent polymers. The solution may be introduced via spraying or injecting, and then cross-linked once it is introduced to the desired location relative to the synthetic turf system.

In addition to introducing super absorbent polymers into one or more layers of a traditional synthetic turf, a solution of one or more non-cross-linked acrylic polymers and one or more cross-linking agents may be injected or introduced into a synthetic turf in this manner having a cooling mat as set forth herein, in order to resupply, energize, and/or otherwise increase the water retention and cooling effect of the cooling mat.

The life of the super absorbent polymers depends on various conditions, including, for example, adjacent soil conditions, microbes that feed on the super absorbent polymers, fungi, UV, foot traffic, weather conditions, and the like. Some super absorbent polymers may have a life of several years and have an estimated cost of less than about one third of a comparative amount of rubber granules.

The cooling mat may be further comprised of at least one neutralizing material to assist in controlling moisture content and liquid absorbing capacities of the super absorbent polymers.

In various exemplary embodiments, the cooling mat is bonded to the backing layer. The bonding may be by way of one or more adhesives, for example. The cooling mat may also be attached to the backing layer via a mechanical means of stitching and/or stapling, for example, by way of the attached grass-like filaments and/or other thread. In other various exemplary embodiments, the cooling mat and backing layer are adjacent but not chemically or mechanically attached.

In a preferred embodiment, even when the super absorbent polymers swell or expand to the greatest extend with water or other fluid, the cooling mat still has channels or openings allowing water, air, moisture, or a combination thereof to flow through to the foundation and ground or evaporation through the synthetic turf system. Such channels or openings decrease pooling of water or fluids on the surface of the synthetic turf systems as well.

The cooling mat of exemplary embodiments herein is preferably of an open structure to allow some flow of liquids, air, moisture, or a combination thereof through the cooling layer.

Moisture evaporation will absorb much of the heat from the synthetic turf system. The cooling mat substantially holds moisture in the polymer and slowly allows evaporation, substantially controlled by diffusion of moisture out of the polymer, cooling the synthetic turf system over time.

The synthetic turf according to the various exemplary embodiments herein may further include a particulate infill comprised of one or more super absorbent polymers, sand, rubber granules, ceramic beads, soil and combinations thereof. Such particulate infill may be positioned between and around the grass-like filaments.

In various exemplary embodiments of the present invention, when combining super absorbent polymers with sand, rubber granules, ceramic beads, soil or combinations thereof, the particulate infill is substantially homogeneous. That is, for example, it is preferred in various exemplary embodiments that the particulate infill not be divided into various layers of materials.

The particulate infill materials, in conjunction with the grass-like filaments attached to the backing layer, tend to mutually stabilize and hold one another in predetermined position. However, as the super absorbent polymers change size depending on moisture conditions, there is some shifting of the particulate infill materials.

When the super absorbent polymers are at a higher moisture retention, the super absorbent polymers are more flexible and absorb imparted impacts more effectively, thereby potentially reducing injuries to individuals hitting the synthetic turf system. The overall desired flexibility of impact absorption and playing characteristics desired by a synthetic turf system may be manipulated by varying the percentage of super absorbent polymers in the particulate infill.

Natural grass may be grown within and through the synthetic turf system. The natural grass may provide a more realistic appearance to the synthetic turf system. The synthetic turf system may further comprise nutrients for natural grass. In another embodiment, the synthetic turf system may further comprise controlled release nutrients.

The synthetic turf system may further comprise an underground sprinkler system for applying water to the super absorbent polymers as needed, one or more thermal probes for determining the temperature of the synthetic tuft systems, or a combination thereof. The one or more thermal probes may be a thermocouple system in substantial contact with the synthetic turf system and would allow remote monitoring of the installation.

The super absorbent polymers and/or the cooling mat may further be treated with one or more antimicrobial agents, one or more anti-freezing agents, or a combination thereof.

2. Description of the SAP-Coated Substrates

As described herein, it is desirable to have a superabsorbent polymer (SAP) in the infill of synthetic turf to provide a source of water for evaporative cooling of the turf surface during hot weather. Hydrated SAP is a soft material that can change the athletic performance properties of the turf if it is concentrated within the turf infill.

It has now been found that in order to prevent undesirable changes in the turf caused by concentrated areas of SAP, it is advantageous to have the SAP widely distributed within the turf infill material(s). Wide distribution allows enough SAP to be present in the infill to provide evaporative cooling, but the amount of SAP in any discrete area is not enough to change the turf performance properties.

Figure 4:
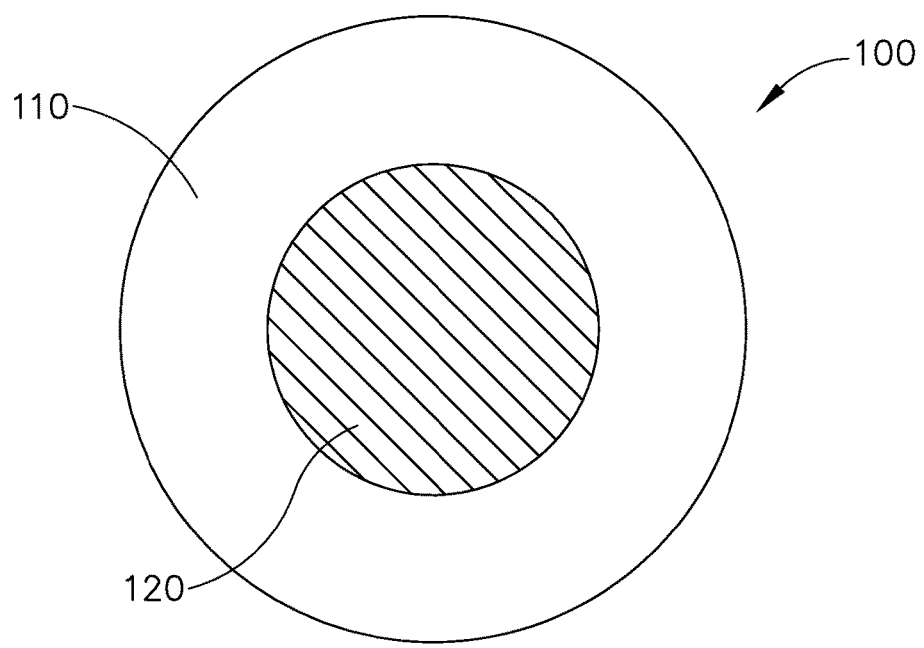
FIG. 4 is an illustration representing an exemplary embodiment of the present invention in which resilient or nonresilient core particle is coated with a layer of superabsorbent polymer.

FIG. 4 is an illustration of an exemplary embodiment of a synthetic turf infill cooling particles 100 of the present invention. As shown, the cooling particle 100 comprises a layer of water-absorbing material 110 coating a foundation comprising a core substrate 120. In one embodiment, the cooling particle 100 is comprised of a core particle or substrate 120, which is coated with a water-absorbing material. In one embodiment, the water-absorbing material is a super absorbent polymer.

Figure 5:
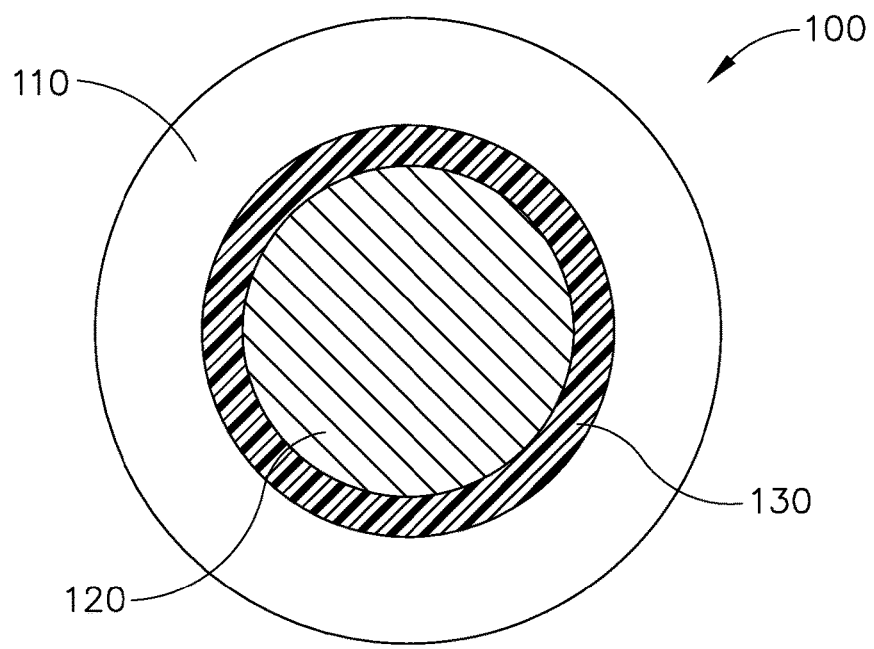
FIG. 5 is an illustration representing an exemplary embodiment of the present invention in which resilient or nonresilient core particle is coated with a layer of binder that promotes adhesion of the coating of superabsorbent polymer.

According to another embodiment, as illustrated in FIG. 5, comprising a core 120, a binder 130 surrounding the core 120 in the form of a coating, layer or shell and water-absorbing material 110 surrounding the binder-coated core 120 to form the final water-absorbing particle. In another embodiment, the water-absorbing material "surrounds" a core or substrate (e.g., sand, ground rubber, powder, granules, clumps, etc.) forming a water-absorbing particle 100.

In one embodiment, a coupling agent or binder 130 is used between the substrate 120 (e.g., rubber particles, silica sand grains, etc.) and the water-absorbing material coating material no. Such binders are characterized by having an improved adherence to the surface of the core as well as to the water absorbing coating material as compared to the adherence between the coating material and the core surface when being in direct contact. The binders may be used alone or in a combination of two or more thereof.

In one embodiment, the binding agent is a silane. In another embodiment, the silane is one or more organosilozane, silane monomer, or mixtures thereof.

In one embodiment, the binding agent is bifunctional silane comprising a reactive amino group and a hydrolyzable inorganic triethoxysilyl group, so that the silane binds to inorganic materials, i.e. the sand grains and rubber particles, as well as to organic polymers, i.e. the coating material. In one embodiment, the bifunctional silane is 3-aminopropyltriethoxysilane ($H_2N$—$(CH_2)_3$—$Si(OC_2H_5)_3$), which is sold by the company Degussa under the trade name of Dynasylan Ameo. The silane is typically applied in a thin layer on the surface of the core in an amount of about 0.05 to about 0.5% by weight of the core, and more preferably in an amount of about 0.1 to about 0.3% by weight. Combinations of the mentioned coupling agents with each other or with other coupling agents may alternatively be applied.

In one embodiment, the binding agent is selected from the group consisting of 3-glycidoxypropyl)trimethoxysilane, (cyclohexyl)methyldimethoxysilane, 3-(triethoxysilyl)propylsuccinic anhydride, dicyclopentyldimethoxysilane, dimethyldiethoxysilane, dimethyldimethoxysilane, isooctyltriethoxysilane, isooctyltrimethoxysilane, methyltriethoxysilane, methyltrimethoxysilane, N-(2-aminoethyl) (3-aminopropyl)methyldimethoxysilane, N-(2-aminoethyl)(3-aminopropyl)triethoxysilane, N-(2-aminoethyl)(3-aminopropyl)trimethoxysilane, N-(3-(triethoxysilyl)propyl)methylurethane, N-(3-(triethoxysilyl) propyl)urea, N-cyclohexylaminomethylmethyldiethoxysilane, phenyltriethoxysilane, tetraethoxysilane, and tetramethoxysilane.

A binder may be added to the mixer prior to the superabsorbant polymer, which provides a layer of the binder on the surface of the core particles before the superabsorbant polymer is added to the content of the mixer, thereby improving the binding between the core and the superabsorbant polymer. In another embodiment, the binder may be added to the mixer simultaneously with the superabsorbant polymer, which provides improved physical integrity of the superabsorbant polymer.

In some embodiments of the invention, the average thickness of the coating is from about 1 to about 1000 µm. In another embodiment, the average thickness of the coating is from about 5 µm to about 500 µm. In another embodiment, the average thickness of the coating is from about 10 µm to about 250 µm. In another embodiment, the average thickness of the coating is from about 10 µm to about 100 µm.

A particle 100 of water-absorbing material coated granular material is shown diagrammatically in FIGS. 4 and 5. Particle 100 includes a core 120 of granular material, which may be fabricated of a metallic material, a ceramic material, a stone material, a mineral material, a hard plastic material or any other hard material. In another embodiment, the core 120 comprises a granular material. In one embodiment, the core 120 is a particle of sand, and in another embodiment, quartz sand. In another embodiment, the core 120 comprises a resilient particle. In another embodiment, the core 120 comprises a polymer material. In another embodiment, the core 120 comprises a rubber material. In another embodiment, the core 120 comprises SBR crumb rubber.

The resilient particles and the particles 100 of water-absorbing material coated granular material have a median size that is within a range of about 5 to about 60 mesh. More preferably, both types of particles have a median size that is substantially within a range of about 10 to about 45 mesh.

In another embodiment, the particles 100 of water-absorbing material coated granular material are fabricated so that the water-absorbing material coating comprises about 0.2% to about 10% by weight of core 120 of granular material. In another embodiment, the water-absorbing material coating comprises about 0.4% to about 5.0% by weight of the core 120 of granular material. In another embodiment, the water-absorbing material coating comprises about 0.6% to about 3.0% by weight of the core 120 of granular material.

The core 120 of granular material is preferably quartz sand and is preferably of an overall grain diameter in the range of about 0.0001 inches to about 0.2 inches, and in another embodiment, in the range of about 0.001 inches to about 0.1 inches, and most preferably in the range of about 0.015 inches to about 0.05 inches.

In some embodiments of the invention, a lightweight or heavyweight core material can be used to import differing performance characteristics. The core can be solid, hollow, absorbent, nonabsorbent, and combinations of these. In some embodiments of the invention, lightweight core materials include but are not limited to calcium bentonite clay, attapulgite clay, perlite, silica, non-absorbent silicious materials, sand, plant seeds, polymeric materials, ground rubber and mixtures thereof. In some embodiments of the invention, heavyweight cores may be used when it is desirable to have heavier particles. Heavy particles may be useful, for example, to add ballast to the field. Illustrative heavyweight core materials include but are not limited to sand, stone, metal, glass, clay, etc.

In one embodiment, water-absorbing materials may be used as the core of the particle without departing from the spirit and scope of the present invention. Illustrative absorbent materials include but are not limited to minerals, fly ash, absorbing pelletized materials, perlite, silicas, other absorbent materials and mixtures thereof. In one embodiment, minerals include: bentonites, zeolites, fullers earth, attapulgite, montmorillonite diatomaceous earth, opaline silica, crystalline silica, silica gel, alumina, Georgia White clay, sepiolite, calcite, dolomite, slate, pumice, tobermite, marls, attapulgite, kaolinite, halloysite, smectite, vermiculite, hectorite, Fuller's earth, fossilized plant materials, expanded perlites, gypsum and other similar minerals and mixtures thereof.

A suitable superabsorbent polymer may be selected from natural, biodegradable, synthetic and modified natural polymers and materials. Superabsorbent polymers include internal cross-linking. The superabsorbent polymer composition may include surface treatment of the superabsorbent polymer as set forth herein.

In one embodiment, the superabsorbent polymer of the present invention is obtained by the initial preparation of a polymeric resin by the polymerization of from about 55 to about 99.9 wt. % of polymerizable unsaturated acid group containing monomers. Suitable monomers include those containing carboxyl groups, such as acrylic acid, methacrylic acid or 2-acrylamido-2-methylpr-opanesulfonic acid, or mixtures of these monomers are preferred here. In one embodiment, at least about 50-weight %, and more preferably at least about 75 wt. % of the acid groups to be carboxyl groups.

In one embodiment, monomers, which can be used for the preparation of the polymeric resins according to the present invention, are 0-40 wt. % of ethylenically unsaturated monomers which can be copolymerized with acrylamide, methacrylamide, hydroxyethyl acrylate, dimethylaminoalkyl (meth)-acrylate, ethoxylated (meth)-acrylates, dimethylaminopropylacrylam-ide or acrylamidopropyltrimethylammonium chloride. More than 40 wt. % of these monomers can impair the swellability of the polymers.

In another embodiment, the superabsorbent polymers of the present invention may be surface cross-linked after polymerization. Surface cross-linking is any process that increases the cross-link density of the polymer matrix in the vicinity of the superabsorbent particle surface with respect to the cross-linking density of the particle interior. The superabsorbent polymers are typically surface cross-linked by the addition of a surface cross-linking agent. Preferred surface cross-linking agents include chemicals with one or more functional groups, which are reactive towards pendant groups of the polymer chains, typically the acid groups. The content of the surface cross-linking agents is from about 0.01 to about 5 wt. %, and preferably from about 0.1 to about 3.0 wt. %, based on the weight of the dry polymer.

In one embodiment, the SAP polymer is in solution as an uncross-linked linear polymer as it is coated onto the infill particles, which is then cross-linked after the substrate/core particle is coated.

In one embodiment, the SAP is manufactured using a cross-linked aqueous solution polymer composition consisting of about 15 wt.-% to about 50 wt.-% of at least one water-soluble monomer and a cross-linking agent as described in U.S. Pat. No. 7,438,951 by Anderson et al. and assigned to H.B. Fuller Licensing & Financing, Inc., incorporated herein in its entirety for all purposes.

In one embodiment, the at least one water-soluble monomer is an alpha, beta-ethylenically unsaturated carboxylic acid monomer. In one embodiment, the polymer solution is sufficiently low enough in viscosity such that it can be applied in aqueous form, yet after cross-linking possesses a fast rate of acquisition and is highly absorbent.

In one embodiment, the aqueous polymer composition consists essentially of one or more water-soluble monomers, preferably at least one alpha, beta-ethylenically unsaturated carboxylic acid monomer and a cross-linking agent. In another embodiment, the polymer is produced from a solution polymerization of the monomer(s) that is subsequently neutralized with a base to a pH ranging from about 7 to 10. In another embodiment, the extent of cross-linking and compatibility of the cross-linking agent is controlled by employing a portion of volatile base in the neutralization process. In another embodiment, the dissipation of the base upon application liberates a controlled concentration of carboxylic groups to allow cross-linking. In another embodiment, prior to cross-linking, the polyacrylate composition has a viscosity ranging from about 50 cPs to about 20,000 cPs and preferably from about 100 cPs to about 5,000 cPs for about a 20 wt.-% solids content solution. In another embodiment, the cross-linking agent is added at a weight ratio of 10 parts polyacrylate polymer to 1 part cross-linking agent. In another embodiment, the aqueous superabsorbent polymer composition is combined with various water-based adhesives to improve the flexibility, and/or hydrophilic properties and/or adhesive properties and/or cohesive strength. In another embodiment, the water-based adhesives are selected and employed at concentrations such that the absorbent nature of the SAP polymer is not adversely impaired.

In one embodiment, the superabsorbent polymer composition of the present invention comprises an aqueous medium of 5 wt-% to about 65 wt-% solids of a polymer prepared by an aqueous solution polymerization of one or more water-soluble monomers. The preferred water-soluble monomers are alpha, beta-ethylenically unsaturated mono- or dicarboxylic acids and acid anhydrides, such as acrylic acid, methacrylic acid, crotonic acid, maleic acid/anhydride, itaconic acid, fumaric acid and the like with acrylic acid being the most preferred. The polymerization of such monomers produces an alkali soluble polyelectrolyte. Small amounts of other water-soluble monomers may be incorporated. Examples may include 2-hydroxyethyl acrylate, 2-hydroxyethyl methacrylate, vinyl pyrolidone, acrylamide, methacrylamide, sodium vinyl sulfonate, 1-allyloxy-2-hydroxypropane sulfonate, etc. The invention also contemplates the use of small amounts of water insoluble monomers provided the intended properties of the pre-cross-linked and/or post-cross-linked polymer are not adversely affected.

Any free radical generating source, such as peroxides and persulfates, may be used to initiate the polymerization of the monomers and carry out the polymerization well known to those skilled in the art. Further, chain transfer agents known in the art may be employed to alter the molecular weight.

In one embodiment, the aqueous composition of the carboxylic acid-containing polymer contains about 5 wt-% to about 65 wt-%, preferably about 10 wt-% to about 50 wt-%, and more preferably about 20 wt-% to about 40 wt-% solids. Once polymerized, the aqueous composition is adjusted to a pH of about 7-10 using an alkali metal hydroxide, such as sodium hydroxide or potassium hydroxide, and/or an alkaline earth metal hydroxide, such as calcium hydroxide. Further, a metal alkoxide can be used in place of the metal hydroxide. It is preferred to first neutralize from about 50% to 95%, more preferably from about 65% to 85% and most preferably about 75% of the acid groups with the alkali metal hydroxide and then further neutralized with a volatile fugitive alkaline component to a pH of 7.0 or above. At least a portion of the volatile/fugitive base dissipates upon application of the aqueous SAP to the substrates, but not prior to use. The dissipation of the base liberates a sufficient portion of the carboxylate groups to the free acid (carboxylic) form. This liberation allows for reaction with the cross-linking agent.

In another embodiment, the viscosity of the polymer solution ranges from about 50 cPs to about 50,000 cPs, more typically from about 100 cPs to about 30,000 cPs, preferably from about 100 cPs to about 20,000 cPs, more preferably from about 100 cPs to about 10,000 cPs, even more preferably from about 100 cPs to about 5,000 cPs and most preferably from about 100 cPs to about 2500 cPs. At too high of a viscosity the aqueous solution is difficult to handle and process, whereas at too low of a viscosity the ability to absorb fluid is substantially diminished. In one embodiment, the aqueous polyacrylate polymer is sufficiently low in viscosity such that the composition may be applied via spray techniques and/or saturate and/or coat a surface or substrate.

In another embodiment, a sufficient amount of cross-linking agent is added to the aqueous polymer composition. Suitable cross-linking agents include any substance that will react with the hydrophilic groups of the aqueous solution polymer. In one embodiment, the selection and concentration of cross-linking agent will affect the absorbent rate and capacity. It is desirable that the cross-linking agent employed "reacts" with the functional groups on the polyacrylate polymer in less than 24 hours and at ambient (20° C.) and/or elevated temperatures.

In another embodiment, the objects of the present invention are attained in a dry, solid, water-swellable, water-insoluble absorbent composition of matter comprising an ionic complex of a water-soluble anionic polyelectrolyte and a polyvalent metal cation having a valence of at least 3, the cation being present in the amount of 0.01-5.0 milliequivalents per gram of poly-electrolyte as described in U.S. Pat. No. 4,090,013 to Ganslaw et al., and assigned to National Starch and Chemical Corp., incorporated herein in its entirety for all purposes. In another embodiment, the composition provides a gelatinous agglomerate of liquid-swollen particulate members in the presence of a quantity of body exudate, is capable of absorbing at least about fifteen times its weight in body exudate, is capable of retaining absorbed exudate when exposed to pressure sufficient to deform the agglomerate, and is capable of uncomplexing at an elevated pH and recomplexing at a lower pH. The latter feature enables its application to a substrate by conventional fluid application techniques.

In another embodiment, the poly-electrolyte generally contains anionic groups, such as carboxylate, sulfonate, sulfate and phosphate groups, and mixtures thereof. In another embodiment, the up to 95%, and preferably 40-85%, of such groups may be neutralized to enhance absorbency of the composition. In another embodiment, the poly-electrolyte is a synthetic polymer. In another embodiment, the poly-electrolyte is polyacrylic acid.

In another embodiment, the cation is a metal, preferably aluminum, iron, chromium, zirconium, titanium, or mixtures thereof, with aluminum being especially preferred. In another embodiment, the cation is optimally present in the amount of 0.1-1.0 milliequivalents per gram of poly-electrolyte. In another embodiment, the poly-electrolyte is polyacrylic acid having 40-85% of its carboxylate groups neutralized, and the cation is aluminum and is present in the amount of 0.1-1.0 milliequivalents per gram of poly-electrolyte.

In another embodiment, the poly-electrolyte is poly-electrolyte is a natural or synthetic polymer characterized by substantial water-solubility in an aqueous medium of some relatively neutral pH (somewhere from 2.0 to 8.5 pH) and by the presence of anionic groups (preferably carboxyl, sulfonate, sulfate or phosphate anionic groups). In another embodiment, the natural polymers are the anionic derivatives of starch or cellulose, and the preferred synthetic polymers are the carboxylic acid homopolymers or copolymers containing at least 20 mole percent carboxylic acid units, e.g., polyacrylic acid.

In another embodiment, the poly-electrolyte is carboxylic acid-containing poly-electrolytes are the synthetic copolymers of ethylenically unsaturated monomers with mono-ethylenically unsaturated carboxylic acids or partially neutralized salts thereof. Examples of the preferred α,β-mono-unsaturated carboxylic acids include acrylic acid, methacrylic acid, maleic acid, maleic anhydride, itaconic acid, itaconic anhydride, fumaric acid, half esters or half amides of maleic, fumaric and itaconic acid, crotonic acid, etc. Examples of the preferred α,β-ethylenically unsaturated monomers include acrylamide or methacrylamide and their N and N, N dialkyl derivatives containing 1-18 carbon alkyl groups, alkyl acrylates and methacrylates containing 1-18 carbon alkyl groups, vinyl esters, vinyl aromatic compounds, dienes, etc.

In another embodiment, the homopolymers of monoethylenically unsaturated carboxylic acids or mixtures of these monomers may also be used. Examples include acrylic and methacrylic acid homopolymers and acrylic acid/methacrylic acid copolymers.

In another embodiment, the sulfonic acid-containing polyelectrolytes are the homopolymers of monoethylenically unsaturated sulfonic acids (or salts thereof) and copolymers thereof with the aforementioned ethylenically unsaturated monomers. Suitable sulfonate-containing monomers include aromatic sulfonic acids (such as styrene sulfonic acids, 2-vinyl-3-bromobenzenesulfonic acid, 2-vinyl-4-ethylbenzenesulfonic acid, 2-allylbenzene sulfonic acid, vinylphenylmethane-sulfonic acid and 1-sulfo-3-vinylphenylmethane sulfonic acid), heterocyclic sulfonic acids (such as 2-sulfo-4-vinylfurane and 2-sulfo-5-allylfurane), aliphatic sulfonic acids (such as ethylenesulfonic acid and 1-phenylethylene sulfonic acid), sulfonic acids containing more than a single acid radical (such as α-sulfoacrylic acid and α-sulfoethylenesulfonic acid), and sulfonic acid derivatives hydrolizable to the acid form (such as alkenyl sulfonic acid compounds and sulfoalkylacrylate compounds).

In another embodiment, the sulfate-containing polyelectrolytes are those formed by reacting homopolymers and copolymers containing hydroxyl groups or residual polymer unsaturation with sulfur trioxide or sulfuric acid; for example, sulfated polyvinyl alcohol, sulfated hydroxyethyl acrylate, sulfated hydroxypropyl methacrylate. Exemplary of the phosphate-containing poly-electrolytes are the homopolymers and copolymers of ethylenically unsaturated monomers containing a phosphoric acid moiety, such as methacryloxy ethyl phosphate.

In another embodiment, the poly-electrolytes formed of natural polymers and their derivatives are the carboxylated, sulfonated, sulfated, and phosphated derivatives of cellulose and starch, such as carboxymethyl cellulose and carboxymethyl starch. Naturally occurring anionic poly-electrolytes such as alginates, carrageenen, proteins (such as gelatin, casein, and soya protein), gum arabic, algin, agar, gum ghatti also have utility.

In another embodiment, the polyvalent metal cation complexes the above described poly-electrolyte to render the overall polymer composite substantially insoluble yet highly swellable. The cations have a valence of at least three and are cations of metals belonging to the following groups of the periodic table: IIIB, IVB, VB, VIB, VIIB, VIII, IIIA, IVA, VA, VIA. The preferred metals are aluminum, zirconium, chromium, titanium and iron, and to a lesser degree antimony and bismuth. Aluminum is an especially preferred metal.

In another embodiment, the metal compound can be added prior to, during polymerization or post-added to a polymeric poly-electrolyte solution, the only restraint being that the metal compound be at least ionizable or soluble in the polymer system. The polyvalent metal can be added to the composition by means of a basic, acidic or neutral salt, hydroxide, oxide or other compound or complex which has at least limited solubility in water or an organic solvent in which the poly-electrolyte and/or its constituent monomers are also soluble at the time of cation introduction In another embodiment, the inorganic salts include chlorides, nitrates, sulfates, borates, bromides, iodines, fluorides, nitrites, perchlorates, phosphates, and sulfides, such as aluminum chloride, aluminum sulfate, ferric sulfate, ferric nitrate, antimony trichloride, bismuth chloride, zirconium chloride, chromic sulfate, and chromic nitrate. Examples of organic salts include salts of carboxylic acids such as carbonates, formates, acetates, butyrates, hexanoates, adipates, citrates, lactates, oxalates, oleates, propionates, salicylates, glycinates, glycollates and tartrates; for example, aluminum formoacetate, basic aluminum acetate, chromic acetate, aluminum citrate, aluminum diformate, aluminum triformate, titanium oxalate, ferric acetate, aluminum octate, ferric oleate, zirconium lactate and zirconium acetate.

In another embodiment, the ammonia and amine complexes (and especially those coordinated with ammonia) of these metals are particularly useful. Amines capable of complexing include morpholine, monoethanol amine, diethylaminoethanol and ethylenediamine. Examples of these amine complexes include ammonium zirconyl carbonate, ammonium zirconyl glycinate, and ammonium zirconium chelate of nitrilotriacetic acid. Polyvalent metal complexes (salts) of organic acids that are capable of solubilization in an alkaline pH range may also be employed. Such anions as acetate, glutamate, formate, carbonate, salicylate, glycollate, octoate, benzoate, gluconate, oxalate and lactate are satisfactory. Polyvalent metal chelates wherein the ligand is a bidentate amino acid, such as glycine or alanine, are particularly useful.

Other organic compounds containing polyvalent metals are also useful; for example, the metal alkoxides, metal alkyls, and acetyl acetonates, such as aluminum isopropoxide, titanium acetyl acetonate, aluminum acetyl acetonate, chromic acetyl acetonate, zirconium ethoxide, chromic isobutoxide and triethyl aluminum.

In another embodiment, the cations of one or more of such metals are present in the absorbent composition at a level of 0.01-5.0 milliequivalents of cation per gram of poly-electrolyte, and preferably 0.1-1.0 milliequivalents of cation per gram of poly-electrolyte. Lower cation levels do not render the polymeric composition water-insoluble, while higher cation levels render the polymer composition not only water-insoluble, but also non-swellable.

The superabsorbent polymer according to the invention can further comprise from 0 to about 5 wt. % of a multivalent metal salt, based on the weight of the mixture. In one embodiment, the multivalent metal salt is water-soluble. Examples of metal cations include the cations of Al, Fe, Zr, Mg and Zn. In one embodiment, the metal cation has a valence of at least +3, with Al being most preferred. Examples of anions in the multivalent metal salt include halides, chlorohydrates, sulfates, nitrates and acetates. In one embodiment, the anions are chlorides, sulfates, chlorohydrates and acetates. In one embodiment, the anions are chlorohydrates and sulfates. Aluminum sulfate is the most preferred multivalent metal salt and is readily commercially available. In another embodiment, the form of aluminum sulfate is hydrated aluminum sulfate, preferably aluminum sulfate having from 12 to 14 waters of hydration. Mixtures of multivalent metal salts can be employed.

In another embodiment, the superabsorbent polymers according to the invention may further include from 0 to about 5 wt. % of water-insoluble, inorganic powder. The insoluble inorganic powder additive may be a single compound or a mixture of compounds selected from the above list.

In another embodiment, the superabsorbent polymer according to the invention may also include the addition of from 0 to about 5 wt. % of a surfactant to the polymer particle surface. It is preferred that these be added immediately prior to, during or immediately after the surface cross-linking step. Examples of such surfactants include anionic, non-ionic, cationic and amphoteric surface active agents, such as fatty acid salts, coco amines and amides and their salts, alkylsulfuric ester salts, alkylbenzene sulfonic acid salts, dialkyl sulfo-succinate, alkyl phosphate salt, and polyoxyethylene alkyl sulfate salt; polyoxyethylene alkyl ether, polyoxyethylene alkyl phenol ether, polyoxyethylene fatty acid ester, sorbitan fatty acid ester, polyoxy sorbitan fatty acid ester, polyoxyethylene alkylamine, fatty acid esters, and oxyethylene-oxypropylene block polymer; alkyl amine salts, quaternary ammonium salts; and lauryl dimethylamine oxide. However, it is not necessary to restrict the surfactant to those mentioned above. Such surfactants may be used individually, or in combination.

It is sometimes desirable to employ surface additives that perform several roles during surface modifications. For example, a single additive may be a surfactant, viscosity modifier and react to cross-link polymer chains. Surfactants can be very useful in controlling the "wetting out" of the rubber when SAP solution is applied in situ.

In another embodiment, the polymerizable compounds may be polymerizable by any type of polymerization reaction, by use of a polymerization initiator that is activated, to initiate the polymerization. In one embodiment herein, the polymerization reaction is a free radical reaction, and the polymerizable compounds, e.g. monomers, comprise therefore groups that can form chemical bonds with one another in a radical reaction. Such a free radical polymerization reaction typically takes place in the presence of a radical initiator, as described below. Particularly suitable monomers may include an unsaturated group, e.g. a C=C group.

Monomers herein include ethylene oxide; propylene oxide; ethylenimine; but typically olefinically unsaturated carboxylates and/or carboxylic acids, and/or amides or esters thereof, for example, selected acrylic acids typified by acrylic acid itself, methacrylic acid, α-chloroacrylic acid, α-cyanoacrylic acid, β-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citroconic acid, mesaconic acid, glutaconic acid, aconitic acid, maleic acid, fumaric acid, tricarboxyethylene, and maleic anhydride; and/or any of the carboxylates of these polymerizable compounds, e.g. carboxylate salts.

In another embodiment, the polymerizable compounds include or consist of acrylic acids and/or acrylate salts (and/or precursors thereof, such as typically acrylic esters).

In another embodiment, the anionic group precursors include methoxyethyl esters (e.g. acrylic ester), ethoxyethyl esters (e.g. acrylic ester), methyl esters (e.g. acrylic ester), and ethyl esters (e.g. acrylic ester).

It should be understood that polymerizable compounds that do not have an anionic group or precursor, may be used herein. Such compounds can include, for example, monomers containing the following types of functional groups: hydroxyl groups, amino groups, and aryl groups (e.g., phenyl groups, such as those derived from styrene monomer). Other optional polymerizable monomers that may be used in addition include unsaturated hydrocarbons such as ethylene, propylene, i-butene, butadiene, and isoprene. These non-acid monomers are well-known materials and are described in greater detail, for example, in U.S. Pat. No. 4,076,663 (Masuda et al.), issued Feb. 28, 1978, and in U.S. Pat. No. 4,062,817 (Westerman), issued Dec. 13, 1977.

In another embodiment, the polymerization rate can be controlled through the identity and amount of the initiator system used. As for example described in US2008/242817, the use of azo compound initiator or redox initiators is advantageous for directing the rate of polymerization.

For some initiators, no activation is needed; other initiators may require activation, as known in the art. The initiator may be activated by any method known in the art, including heat or radiation. Thereto, it may be desirable that the dispersions/solutions of the monomer compound and/or clay are cooled (e.g. to a temperature of less than polymerization temperature, e.g. less than 20° C., or less than 10° C.) or and/or shielded from radiation prior to introduction of the initiator, and optionally at the moment of addition of the initiator, and that the combination of initiator and dispersion/solution is exposed to the activation source, e.g. heat, radiation, only at the desired moment, for example upon introduction onto the spraying step/spraying tool or upon introduction into the vessel. In another embodiment, a polymerization catalyst may also be present, such as for example TMEDA, N,N,N',N' tetramethylethylenediamine.

In another embodiment, the superabsorbent polymer can comprise from 0 to about 5 wt. % of a penetration modifier that is added immediately before, during or immediately after the surface cross-linking agent. Examples of penetration modifiers include compounds which alter the penetration depth of surface-modifying agents in to the superabsorbent polymer particle, fiber, film, foam or bead by changing the viscosity, surface tension, ionic character or adhesion of the agents or medium in which these agents are implied.

In another embodiment, aqueous superabsorbent polymer solution can be blended with polyethylene and extruded into hydrophilic yarn, which can be then tufted into synthetic turf system. In one embodiment, the coated infill achieves the goal of distributing the SAP over as much surface area as possible such that the distribution facilitates cooling without concentrated SAP. The surface area of the total yarn element in the synthetic turf system is substantial, which would allow a very small amount of the Aqueous SAP being added as to not diminish the strength of the fiber. Therefore, while it is an option in certain embodiments, it is not necessary to have 100% of the yarn act as a SAP carrier. In one embodiment, at least 10%, 20%, 30%, 40%, 50%, 60%, 70%, 80%, or 90% of the synthetic turf system tufts are composed yarn comprising aqueous superabsorbent polymer solution blended with polyethylene and extruded into hydrophilic yarn.

In another embodiment, the superabsorbent polymer is suitably prepared by two methods. The polymer can be prepared continuously or discontinuously in a large-scale industrial manner by the above-mentioned known process, the after-cross-linking being carried out accordingly.

An anionic polymer is intended to refer to a polymer comprising a functional group or groups capable of becoming negatively charged ions upon ionization in an aqueous solution. In general, suitable functional groups for an anionic polymer include, but are not limited to, carboxyl groups, sulfonate groups, sulphate groups, sulfite groups, and phosphate groups. Suitably, the functional groups are carboxyl groups. It is preferred that these functional groups are in neutralized form. A suitable degree of neutralization is at least 50%, more suitably at least 80%, and even more suitably at least 100%.

A cationic polymer is intended to refer to a polymer comprising a functional group or groups capable of becoming positively charged ions upon ionization in an aqueous solution. In general, suitable functional groups for a cationic polymer include, but are not limited to, primary, secondary, or tertiary amino groups, imino groups, imido groups, amido groups, and quaternary ammonium groups. It is suitable that these functional groups are in neutralized form. A suitable degree of neutralization is at least 50%, more suitably at least 60%, and even more suitably at least 70%.

Examples of synthetic anionic superabsorbent polymers include the alkali metal and ammonium salts or partial salts of poly(acrylic acid), poly(methacrylic acid), hydrolyzed poly(acrylamides), maleic anhydride copolymers with vinyl ethers and alpha-olefins, poly(vinyl acetic acid), poly(vinyl sulfonic acid), poly(vinyl phosphonic acid), poly(vinyl ethers), poly(vinyl pyrrolidone), poly(vinylmorpholinone), poly(vinyl alcohol), and mixtures and copolymers thereof. Examples of natural based anionic polymers include the salts or partial salts of carboxymethyl cellulose, carboxymethyl starch, alginates, and carrageenans. Also, synthetic polypeptides such as polyaspartic acid and polyglutamic acid can be examples of the anionic polymers. Examples of synthetic cationic superabsorbent polymers include the salts or partial salts of poly(vinyl amines), poly(allylamines), polyethylene imine), poly(amino proanol vinyl ethers), poly(acrylamidopropyl trimethyl ammonium chloride), poly(diallyldimethyl ammonium chloride). Examples of natural based cationic polymers include partially deacetalated chitin, chitosan and chitosan salts. Also synthetic polypeptides such as polyasparagins, polylysines, polyglutamines, polyarginines can be examples of the cationic polymers.

In some aspects, the present invention may further include post treating the superabsorbent polymer composition after surface treatment with up to about 5% by weight of the dry superabsorbent polymer composition, such as from about 0.1 to about 5% by weight of a cationic polymer. A cationic polymer as used herein refers to a polymer or mixture of polymers comprising a functional group or groups having a potential of becoming positively charged ions upon ionization in an aqueous solution. Suitable functional groups for a cationic polymer include, but are not limited to, primary, secondary, or tertiary amino groups, imino groups, imido groups, amido groups, and quaternary ammonium groups. Examples of synthetic cationic polymers include the salts or partial salts of poly(vinyl amines), poly(allylamines), poly(ethylene imine), poly(amino propanol vinyl ethers), poly(acrylamidopropyl trimethyl ammonium chloride), poly(diallyldimethyl ammonium chloride). Examples of natural based cationic polymers include partially deacetylated chitin, chitosan and chitosan salts. Synthetic polypeptides such as polyasparagins, polylysines, polyglutamines, polyarginines are also suitable cationic polymers.

In one embodiment, performance-enhancing additive(s) are added to the material. In one embodiment, the performance-enhancing additive(s) are antimicrobials. In one embodiment, the antimicrobial actives are boron containing compounds such as borax pentahydrate, borax decahydrate, boric acid, polyborate, tetraboric acid, sodium metaborate, anhydrous, boron components of polymers, and mixtures thereof.

In one embodiment, the odor absorbing/inhibiting active inhibits the formation of odors. An illustrative material is a water-soluble metal salt such as silver, copper, zinc, iron, and aluminum salts and mixtures thereof. In another embodiment, the metallic salts are zinc chloride, zinc gluconate, zinc lactate, zinc maleate, zinc salicylate, zinc sulfate, zinc ricinoleate, copper chloride, copper gluconate, and mixtures thereof. In another embodiment, the odor control actives include nanoparticles that may be composed of many different materials such as carbon, metals, metal halides or oxides, or other materials. Additional types of odor absorbing/inhibiting actives include cyclodextrin, zeolites, silicas, activated carbon (also known as activated charcoal), acidic, salt-forming materials, and mixtures thereof. Activated alumina ($Al_2O_3$) has been found to provide odor control comparable and even superior to other odor control additives such as activated carbon, zeolites, and silica gel. Alumina is a white granular material, and is also called aluminum oxide.

In some aspects, additional additives may optionally be employed with the particulate superabsorbent polymer compositions, including odor-binding substances, such as cyclodextrins, zeolites, inorganic or organic salts, and similar materials; anti-caking additives, flow modification agents, surfactants, viscosity modifiers, and the like. In addition, additives may be employed that perform several roles during modifications. For example, a single additive may be a surfactant, viscosity modifier, and may react to cross-link polymer chains.

In another embodiment, a color altering agent such as a dye, pigmented polymer, metallic paint, bleach, lightener, etc. may be added to vary the color of absorbent particles, such as to darken or lighten the color of all or parts of the composition so it is more appealing. In another embodiment, the color-altering agent comprises up to approximately 20% of the absorbent composition, more preferably, 0.001%-5% of the composition. In another embodiment, the color altering agent comprises approximately 0.001%-0.1% of the composition.

In another embodiment, the carriers for the color-altering agent are zeolites, carbon, charcoal, etc. These substrates can be dyed, painted, coated with powdered colorant, etc.

In another embodiment, the activated alumina and activated carbon may include an embedded coloring agent that has been added during the fabrication of the activated alumina or activated carbon to form a colored particle.

In composite and other particles, the activated alumina can also be added in an amount sufficient to lighten or otherwise alter the overall color of the particle or the overall color of the entire composition.

Large particles of carbon, e.g., activated carbon or charcoal, can also be used as a darkening agent. Such particles are preferably within a particle diameter size range of about 0.01 to 10 times the mean diameter of the other particles in the mixture.

In another embodiment, the core mentioned above can also be considered an active, for example including a lightweight material in the core to reduce the weight of the particle, a core made of pH-altering material, etc.

(a) Coating of SBR Crumb Rubber

In another embodiment, the largest volume of the infill in most synthetic turf systems consists of SBR crumb rubber sourced from passenger car and small truck tires. The rubber can be either ground under ambient or cryogenic conditions. The particle size of the rubber can vary between 6 and 50 mesh. A desirable particle size range is from 10 to 20 mesh.

In another embodiment, the amount of SAP in the synthetic turf infill should be in a range that provides enough water to cool the turf for a minimum time period to encompass a full athletic event or practice time. It is more desirable to have enough water present to cool the turf over a period of several days to reduce the frequency of hydrating the turf. It is also desirable to keep the SAP content below the level that will change the athletic performance of the synthetic turf surface. The range of SAP levels in the turf should be in the range of 2 grams/sq. ft. to 40 grams/sq. ft. A more desirable range is between 4 and 20 grams/sq ft. An even more desirable range is from 6 to 10 grams/sq ft.

Applying the SAP as a thin coat on all or part of the SBR particle surface provides the most even distribution of the SAP within the turf infill. Most superabsorbent polymers are insoluble and cannot be introduced as a solution for coating the rubber particles. In another embodiment, the coating process can be accomplished by coating the rubber particles with a water solution of a low molecular weight SAP and then cross-linking the low molecular weight polymer chains to form an insoluble polymer coating on the rubber particles. A low molecular weight water-soluble polymer of acrylic acid can be partially neutralized with ammonium hydroxide to provide reactive sites for cross-linking on the prepolymer. In another embodiment, the cross-linking agent is ammonium zirconium carbonate containing hydroxylated zirconium polymers. In another embodiment, the cross-linking reaction takes place at temperatures between 0 and 70° C. Evaporation of the water drives the reaction to completion forming an insoluble high molecular weight polymer coating.

In another embodiment, the coating of the rubber particles with the reactive solution can be accomplished by any means that distributes the water solution evenly over the rubber particle. In another embodiment, the formulated SBR used in tires can have a hydrophobic characteristic that causes the water to be isolated as droplets across the particle surface. SAP coatings made with isolated droplets of reactive polymer solution will have thicker, deposits of SAP that can have less physical integrity than a more evenly distributed film of SAP. In another embodiment, a more uniform film coating is provided by introducing a surfactant into the water solution to reduce the surface tension between the SBR surface and the water solution. In another embodiment, the surfactant can be anionic, cationic, or non-ionic in nature.

It is also desirable to have SAP that retains physical integrity in the hydrated state. This prevents abrasion of the SAP during athletic activity on the synthetic turf. In another embodiment, the physical integrity can be introduced by having a range of 5 to 30% of the acid sites on the polyacrylic acid cross-linked. In another embodiment, the desirable range is 10 to 20% cross-link density.

The physical integrity of the SAP coating and the adhesion of the coating to the SBR surface can be increased by incorporating a binder molecule into the SAP formulation. In another embodiment, the binder has a styrenic portion that is compatible with the styrene butadiene tire rubber. In another embodiment, the binder should also have hydroxyl or carboxyl groups that can react with the zirconium carbonate cross-linker. In another embodiment, the binder can be used in a range of 1 to 50 weight percent based on the amount of SAP weight. In another embodiment, the binder can be mixed with the polymer and cross-linker solution or it can be added as a pre-coat on the SBR particle prior to introduction of the prepolymer/cross-linker solution.

(b) Coating of Sand Infill

Silica sand is used in the majority of $3^{rd}$ generation synthetic turf systems as a ballast to hold the turf in place and to adjust the firmness of the infill mixture to optimize the athletic performance of the turf system. In another embodiment, the sand as well as the rubber can be used as a carrier to introduce the SAP into the turf system. As in the case of the rubber infill, the SAP can be most advantageously introduced as a thin coating of SAP on the sand particles.

The same method of coating the sand particle with a water solution of a pre-polymer of polyacrylic acid with a cross-linker can be used to coat the silica sand. The water solution is blended with the sand to wet out the surface of the sand. The water is allowed to evaporate and drive the cross-linking reaction.

The integrity of the SAP and the adhesion of the SAP to the sand particle surface can be enhanced by using a binder. The binder should contain silane groups that will have affinity for the silica sand surface as well as hydroxyl or carboxyl groups to react with the titanium carbonate cross-linker.

(c) Introduction of the SAP Coated Sand and/or Rubber into the Turf System

The hydrated SAP releases water when the turf system is heated by sunlight. Higher levels of infrared heat in the sunlight releases more water, which in turn provides more cooling to the turf surface. To provide cooling, the SAP must be hydrated and must be located in the system where the heat energy impinging on the turf surface from the sunlight can be effectively transmitted to the hydrated SAP. SAP that is insulated from the sunlight will likely be ineffective at providing cooling to the surface.

The SAP coated rubber or sand can be introduced to the field in the same manner that is used to introduce normal rubber and sand to the infill. The coated infill can be added using a broadcast spreader followed by brushing of the turf to distribute the infill within the synthetic turf grass blades. The sand and rubber can be pre-mixed, mixed in situ by adding the rubber and sand in layers and brushing the turf to mix the layers together. Alternatively, the sand and rubber can be introduced as discrete layers with the sand on bottom and rubber on top.

(d) Infill Particles

As mentioned above, having the water-absorption material coated particles 100 near the surface enhances the effectiveness of the water release. This can be accomplished by putting the SAP coated rubber particles or crumbs or coated rubber and sand mixture in the top layer of the infill and all of the uncoated rubber and rubber/sand mix in the bottom of the infill layer.

To prevent mixing of the coated and non-coated rubber, the rubber used for the coated infill can have a larger particle size than the remainder of the rubber particles. The preferred particle size range for the SAP coated particles is 10-16 mesh. The preferred particle size range for the uncoated rubber particles used in the bottom layer of infill is 18-30 mesh.

For the coated sand to be effective for evaporative cooling, it should be in the top layer of the infill. The higher specific gravity and rounder particle shape of standard sand compared to the SBR rubber used in turf infill causes the sand to migrate to the bottom of the turf during athletic activity and grooming of the athletic field. The SAP coated sand will have lower specific gravity than the uncoated sand. The particle size of the SAP coated sand can also be adjusted to have a final particle size similar in size or slightly smaller than the rubber in the top layer of the infill.

(e) Spraying of SAP solution

The pre-coating of SAP rubber or SAP sand requires the manufacturing steps of coating and drying the infill prior to shipping to the field for installation. The coated materials must also be protected from rainfall during shipping and storage onsite before being installed in the field. It is advantageous to avoid the pre-coating step by introducing the SAP rubber and/or SAP sand by applying the SAP as a solution to the infill while the infill is being installed. The bottom layer of the infill can be installed without any SAP allowing the SAP to be added to the upper layer of infill as the infill is installed.

The aqueous solution of prepolymer, cross-linker, and binder can be sprayed between lifts of rubber or between lifts of rubber and sand. The SAP solution can be introduced as a spray above the turf surface or it can be introduced below the surface of the infill. Introducing the solution under the surface has the advantage of not introducing SAP solution to the grass fibers that are exposed above the turf surface. Introducing the SAP solution as a spray above the turf has the advantage of introducing the SAP with an even distribution across the surface of the turf. The SAP can be introduced at a spray rate combined with the concentration of the water-soluble SAP to yield an amount of SAP in the final turf of 2 to 40 grams of SAP per square foot of turf. The preferred amount of SAP introduced per square foot of turf is from 6 to 10 grams.

The SAP can be introduced in from one to 10 layers. The more layers allow the SAP to be introduced more evenly. The SAP solution can be introduced between layers of infill. When the field is brushed to evenly distribute the infill, the SAP distribution evenness is also increased.

(f) Spraying of Installed Fields

In another embodiment of the invention, fields installed with standard particulates as described above (particularly rubber or rubber/sand mixtures) can be converted to SAP cooled fields by introducing SAP solution into the installed infill. In another embodiment of the invention, fields installed with SAP coated rubber or sand that has lost its effectiveness for cooling can also be reactivated by introducing additional SAP solution. The SAP solution can be introduced by spraying or by injecting the SAP solution into the top layer of the infill. The SAP solution can be introduced into fields during a grooming procedure to distribute the SAP within the infill or the top layer of infill can be removed and reintroduced in layers with the SAP solution added between layers of infill. The SAP solution can also be introduced substantially concurrent with installation of the infill by spraying the infill particles with the SAP solution as it is being installed as an infill layer.

3. Multi-Layer Cooling Mat

In another embodiment of the invention, an improved artificial turf system is described along with a method for constructing a system that reduces temperature, resists compaction, minimizes abrasiveness and that provide superior shock impact resistance and stability in comparison to conventional artificial turf systems.

In one embodiment, the invention comprises fabricating a recreational surface using a mixture comprising resilient and inelastic particles and particles of a rubber coated granular material. In one embodiment, the mixture includes a relative proportion of the resilient particles with respect to the inelastic particles in order to adjust the parameters of the surface.

Figure 3:
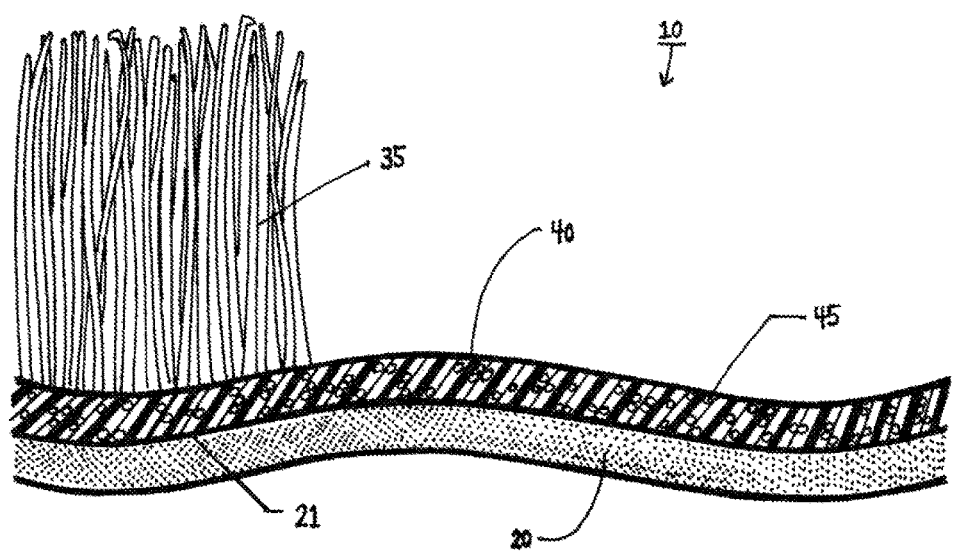
FIG. 3 is an illustration representing an exemplary embodiment of the present invention in which a plurality of grass-like filaments are tufted to the cooling mat without a backing layer.

In an alternative embodiment of the invention that is depicted above and in FIGS. 1-3, the synthetic turf system may further comprise a cooling mat (infill) 40, which may be comprised of one or more layers. When more than one layer comprises the cooling mat, each layer of the cooling mat may be of different compositions than other layers. In one embodiment, at least one of the layers is comprised of a core particle coated with a water-absorbing material. In one embodiment, the water-absorbing material is a super absorbent polymer.

In one or more embodiment of the invention that is depicted above and in FIGS. 1-3, the synthetic turf system may further comprise at least one layer of infill particle mixture having a total height between about 5 and about 60 millimeters.

In one or more embodiment of the invention that is depicted above and in FIGS. 1-3, the synthetic turf system may further comprise at least one layer of infill particle mixture applied to a total height greater than about 10% to about 90% of the average height of the synthetic grass filaments.

In one embodiment, at least one of the layers is comprised of a layer of shock absorbing material. In one embodiment, the layer of shock absorbing material is comprised of synthetic rubber.

In one embodiment, the layer of shock absorbing material has a thickness that is substantially within the range of about 10 mm to about 60 mm and more preferably within a range of about 15 mm to about 40 mm.

In another embodiment, the turf system further comprises a shock pad system.

In one embodiment, the synthetic turf system further comprises a shock pad or E-layer. In one embodiment, the shock pad is applied below the backing layer. There are two general forms of shock pads used in synthetic turf systems. One is an in situ system that is fabricated on site as the turf is installed. The other type is prefabricated and brought to the field to be installed with the turf.

In one embodiment, a shock pad or e-layer may be applied to increase the value of shock absorption and vertical deformation. In one embodiment, the amount of infill material can than be decreased.

In one embodiment, after the manufacturing of the synthetic turf fabric, a shock pad may be glued to or loosely laid upon a resilient pad. In one embodiment, the resilient pad is an elastomeric pad, for example, E-Layer Shock pad. In one embodiment, the pad is from about 1 mm to about 50 mm thick. In another embodiment, the pad is from about 10 mm to about 40 mm thick. In another embodiment, the pad is from about 15 mm to about 35 mm thick. The resilience from the pad provides safer shock absorption levels.

In one embodiment, surface coverings for sporting use are constructed by stitching into a preformed fabric backing layer to form tufts, and then bonding the primary backing layer to an impact-absorbing resilient lower layer or shock pad.

In one embodiment, the layers are chemically as well as physically joined together to form an integrated shock pad capable of multidirectional movement, similar to natural turf.

In one embodiment, the in situ pads are also called elastic layers (e-layers). They are a combination of SBR crumb rubber and a polyurethane binder. The two components are mixed to form a consistency similar to asphalt. The material is installed using a paving machine. The material under the e-layer may be asphalt, concrete, or compacted stone. The e-layers are paved with thickness of 15 to 30 mm. Anything over 20 mm is installed in two layers. One or all layers may contain some small pebble stone to increase the firmness of the e-layer.

In one embodiment, the prefabricated pads comprise an e-layer prepared as a large billet and a 8 to 12 mm thick pad is skived off the outside of the billet. In one embodiment, the material is then rolled and taken to the field and installed in 4 foot widths.

In another embodiment, the pad comprises one or more types of closed cell or open cell foams. In one embodiment, these are prepared as rolls or sheets that are connected to each other on the field base prior to the turf being installed. In one embodiment, the pads can be from 5 to 50 mm thickness depending on the density and material from which the pads are made. In another embodiment, the pads can be from 10 to 40 mm thickness. In another embodiment, the pads can be from 15 to 35 mm thickness.

In one embodiment, the infill 50 includes both resilient particles and particles of inelastic granular material. A resilient particle is defined as a particle that is fabricated from a material or materials that are substantially compressible at pressures that will be applied thereto when a person is walking or running on an artificial turf installation. A resilient particle in the preferred embodiment of the invention is embodied as a rubber particle but could alternatively be fabricated from another resilient material such as cork or vermiculate.

The material from which the rubber particles and/or the particles 100 of water-absorbing material coated granular material is fabricated may be impregnated with a substance that inhibits the growth of bacteria and/or mold. Alternatively, a coating of such a substance may be applied to the external surface of the rubber particle and/or to the external surface of the particles 100 of water-absorbing material coated granular material.

Figure 6:
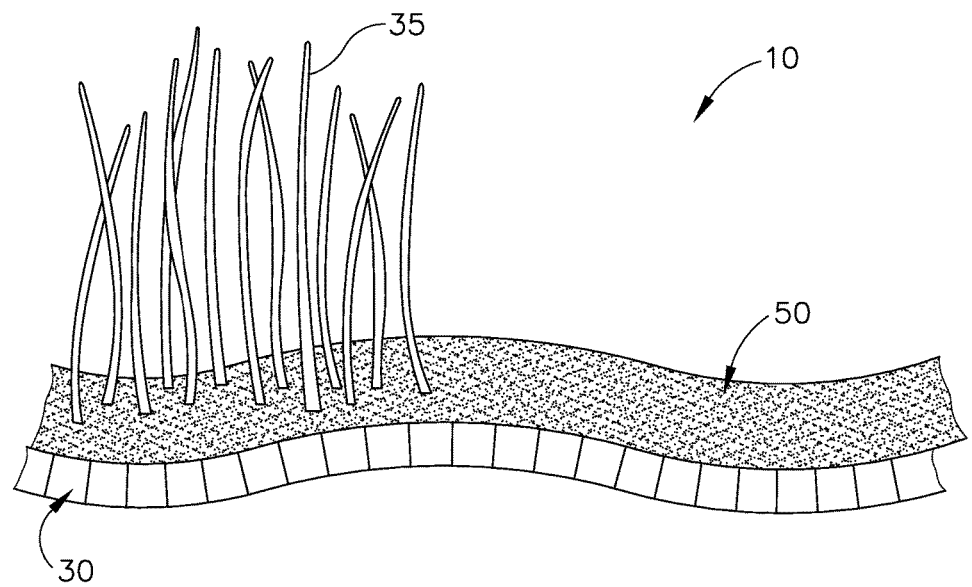
FIG. 6 is an illustration representing an exemplary embodiment of the present invention in which various composition layers of superabsorbent polymer-coated and non-coated resilient core particles, nonresilient core particles or mixtures thereof are coated with superabsorbent polymer and used as infill for an artificial ground substrate.

Referring now to FIG. 6, artificial turf assembly 10 according to a first embodiment of the invention includes a pile fabric having a backing 30. Artificial turf assembly 10 also preferably includes an infill 50, which is preferably a substantially homogeneous mixture of coated particles 100 comprising water-absorbing material coated granular material and rubber particles. In one embodiment, the rubber particles and the particles 100 are sized to have outer diameters that are substantially the same. In one embodiment, the material that is used in the particles 100 is a different material than the rubber material that is used to fabricate the rubber particles, with the material that is used to fabricate the rubber particles preferably having a greater weight density than the material that is used to fabricate the particles 100 comprising granular material coated with water-absorbing material.

In a recreational surface according to a second embodiment of the invention, a pile fabric as described above with reference to the first embodiment is installed. An infill 50 is then installed in separate and distinct layers. In another embodiment, this is performed by first installing a first (bottom) infill layer 60 that comprises granular material, rubber particles or a mixture thereof.

Figure 7:
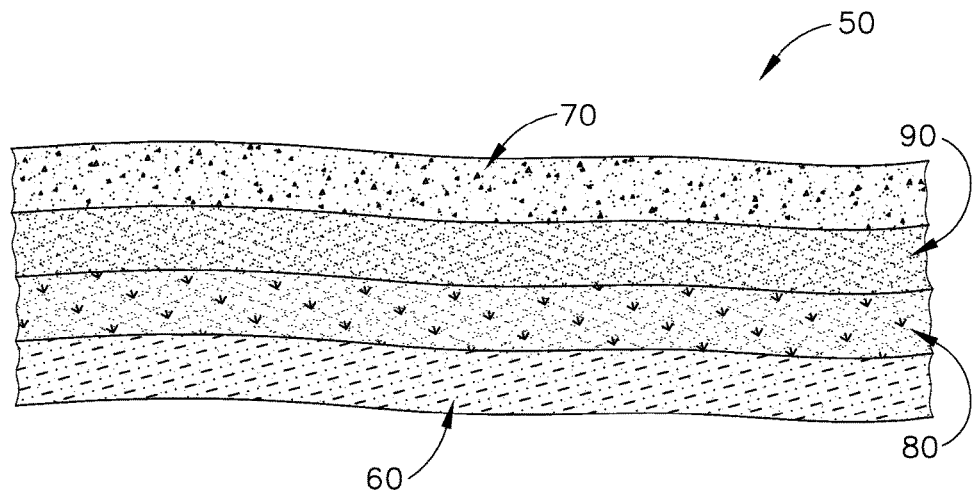
FIG. 7 is an illustration representing a cross-section of the infill used in an exemplary embodiment of the present invention showing various layers of superabsorbent polymer-coated and non-coated resilient core particles, nonresilient core particles or mixtures thereof.

After installation of the first (bottom) infill layer 60, a second (top) infill layer 70 is installed directly on top of the first (bottom) infill layer 60, as seen in FIG. 7. The second infill layer 70 comprises a granular material, rubber particles or a mixture thereof wherein at least a portion of the infill particles are coated with SAP. In one embodiment, the coated infill particles of the second (top) infill layer 70 comprise at least 10%, 20%, 30%, 40%, 50%, 60%, 70%, 80%, 90%, or 100% of the total infill particle mix.

In another embodiment, one or more third (middle) infill layers 80 are installed directly on top of the first (bottom) infill layer 60 but before addition of the second (top) infill layer 70, which is then installed directly on top of the one or more third (middle) infill layers 80. The infill may further comprise one or more additional layers 90 as dictated by performance requirements.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. An artificial grass turf system, the artificial turf comprising a backing layer with a plurality of synthetic grass filaments attached and at least one layer of infill particle mixture comprising cooling granules comprising a core particle having an outer surface; and a superabsorbent polymer composition comprising: (a) one or more water-soluble polymers; and (b) one or more cross-linking agents; wherein the one or more water-soluble polymers comprise polymerizable unsaturated monomers with one or more acid functional groups; wherein from 5 to 30% of the acid groups on the one or more water-soluble polymers are crosslinked by the one or more crosslinking agents to form a superabsorbent polymer composition that is water-swellable and substantially water insoluble but capable of absorbing at least about 5 times its weight in water; wherein the superabsorbent polymer composition forms a coating over the outer surface of the core particle and comprises about 0.2% to about 10% by weight of the core particle; wherein the size of the coated particle has a median size that is within a range of about 5 to about 60 mesh; and wherein the core particle comprises a granular material selected from the group consisting of resilient particles, inelastic particles or combinations thereof, wherein the at least one layer of infill particle mixture occupies at least some of the space between the synthetic grass filaments of the artificial turf.

2. An artificial grass turf system of claim 1, wherein the turf further comprises a foundation, wherein the foundation is selected from one or more of bare ground, stone, gravel, sand, asphalt, cement, shock pad and rubber.

3. An artificial grass turf system according to claim 2, wherein the at least one layer of infill particle mixture has a total height between about 5 and about 60 millimeters.

4. An artificial grass turf system according to claim 3, wherein the at least one layer of infill particle mixture is applied to a total height greater than about 10% to about 90% of the average height of the synthetic grass filaments.

5. An artificial grass turf system according to claim 4, wherein at least a portion of the least one layer of infill particle mixture comprises cooling granules.

6. An artificial grass turf system according to claim 1, wherein the water soluble polymer is applied to the infill core particles in situ.

7. An artificial grass turf system according to claim 5, wherein the at least one layer of infill particle mixture comprises at least two layers of infill particle mixture, the at least two layers having different compositions, and wherein at least one of the layers is specified as containing a proportion of cooling granules comprising at least 20% of the total infill particle mixture.

8. An artificial grass turf system according to claim 5, wherein the at least one layer of infill particle mixture comprises a first infill layer on the backing, the first infill layer predominantly comprising uncoated granular material, rubber particles or a mixture thereof; and a second infill layer placed substantially over the first infill layer, the second infill layer predominantly comprising a granular material, rubber particles or a mixture thereof wherein at least a portion of the second infill layer particles are the cooling granules.

9. An artificial grass turf system according to claim 8, wherein the cooling granules of the second infill layer comprise at least 10% of the infill particle mixture.

10. An artificial grass turf system according to claim 1, wherein the at least one layer of infill particle mixture further comprises one or more intermediate infill layers, wherein the one or more intermediate infill layers are installed substantially on top of the first infill layer, and wherein the second infill layer is then installed substantially on top of the one or more intermediate infill layers.

11. An artificial grass turf system according to claim 10, wherein the one or more intermediate infill layers consists essentially of cooling granules predominantly fabricated from one of either resilient or inelastic core particles.

12. The artificial grass turf system as recited in claim 5 wherein the superabsorbent polymer composition is polyacrylamide or polyacrylate.

13. The artificial grass turf system as recited in claim 12 wherein the at least one layer of infill particle mixture further comprises sand, rubber granules, ceramic beads, soil or combinations thereof.

14. The artificial grass turf system as recited in claim 13 wherein at least one layer of infill particle mixture further comprises one or more performance-enhancing additive.

15. The artificial grass turf system as recited in claim 14 wherein the one or more performance-enhancing additive is selected from the group consisting of antimicrobial, an odor reducing material, a binder, a fragrance, a color altering agent, a dust reducing agent, a nonstick release agent, a superabsorbent material, cyclodextrin, zeolite, activated carbon, a pH altering agent, a UV stabilizer, a salt forming material, a ricinoleate, silica gel, crystalline silica, activated alumina, an anti-clumping agent, and mixtures thereof.

16. The artificial grass turf system as recited in claim 1 wherein the artificial grass turf system is used in football fields, soccer fields, hockey fields, rugby fields, tennis fields, for recreation and playing areas or for athletics tracks.

* * * * *